United States Patent
Shimura

(10) Patent No.: US 12,288,998 B2
(45) Date of Patent: Apr. 29, 2025

(54) POWER RECEIVING APPARATUS, POWER TRANSMITTING APPARATUS, CONTROL METHODS THEREOF, AND A NON-TRANSITORY COMPUTER-READABLE STORAGE MEDIUM

(71) Applicant: CANON KABUSHIKI KAISHA, Tokyo (JP)

(72) Inventor: Hajime Shimura, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/605,683

(22) Filed: Mar. 14, 2024

(65) Prior Publication Data

US 2024/0223019 A1 Jul. 4, 2024

Related U.S. Application Data

(63) Continuation of application No. 17/886,912, filed on Aug. 12, 2022, now Pat. No. 11,962,167, which is a continuation of application No. PCT/JP2021/002605, filed on Jan. 26, 2021.

(30) Foreign Application Priority Data

Feb. 13, 2020 (JP) .................................. 2020-022673

(51) Int. Cl.
*H02J 50/60* (2016.01)
*H02J 50/12* (2016.01)
*H02J 50/40* (2016.01)
*H02J 50/80* (2016.01)

(52) U.S. Cl.
CPC .............. *H02J 50/60* (2016.02); *H02J 50/12* (2016.02); *H02J 50/402* (2020.01); *H02J 50/80* (2016.02)

(58) Field of Classification Search
CPC ............ H02J 50/60; H02J 50/80; H02J 50/12; H02J 50/40; H02J 50/402
See application file for complete search history.

(56) References Cited

U.S. PATENT DOCUMENTS 9,929,605 B2  3/2018  Nakano

FOREIGN PATENT DOCUMENTS

| DE | 202013012728 U1 | 1/2019 |
| KR | 20190050301 A | 5/2019 |
| WO | 2019031748 A1 | 2/2019 |
| WO | 2019088760 A1 | 5/2019 |

*Primary Examiner* — Robert L Deberadinis
(74) *Attorney, Agent, or Firm* — Canon U.S.A., Inc., IP Division

(57) ABSTRACT

A power receiving apparatus capable of receiving power transmitted from a power transmitting apparatus capable of executing first foreign object detection and second foreign object detection, transmits, to the power transmitting apparatus, data to be used by the power transmitting apparatus to execute the first foreign object detection; before transmitting the data, determines whether a predetermined condition for the power transmitting apparatus to execute the second foreign object detection different from the first foreign object detection is satisfied; and transmits, to the power transmitting apparatus, a signal for causing the power transmitting apparatus to execute the second foreign object detection in accordance with the determination.

5 Claims, 25 Drawing Sheets

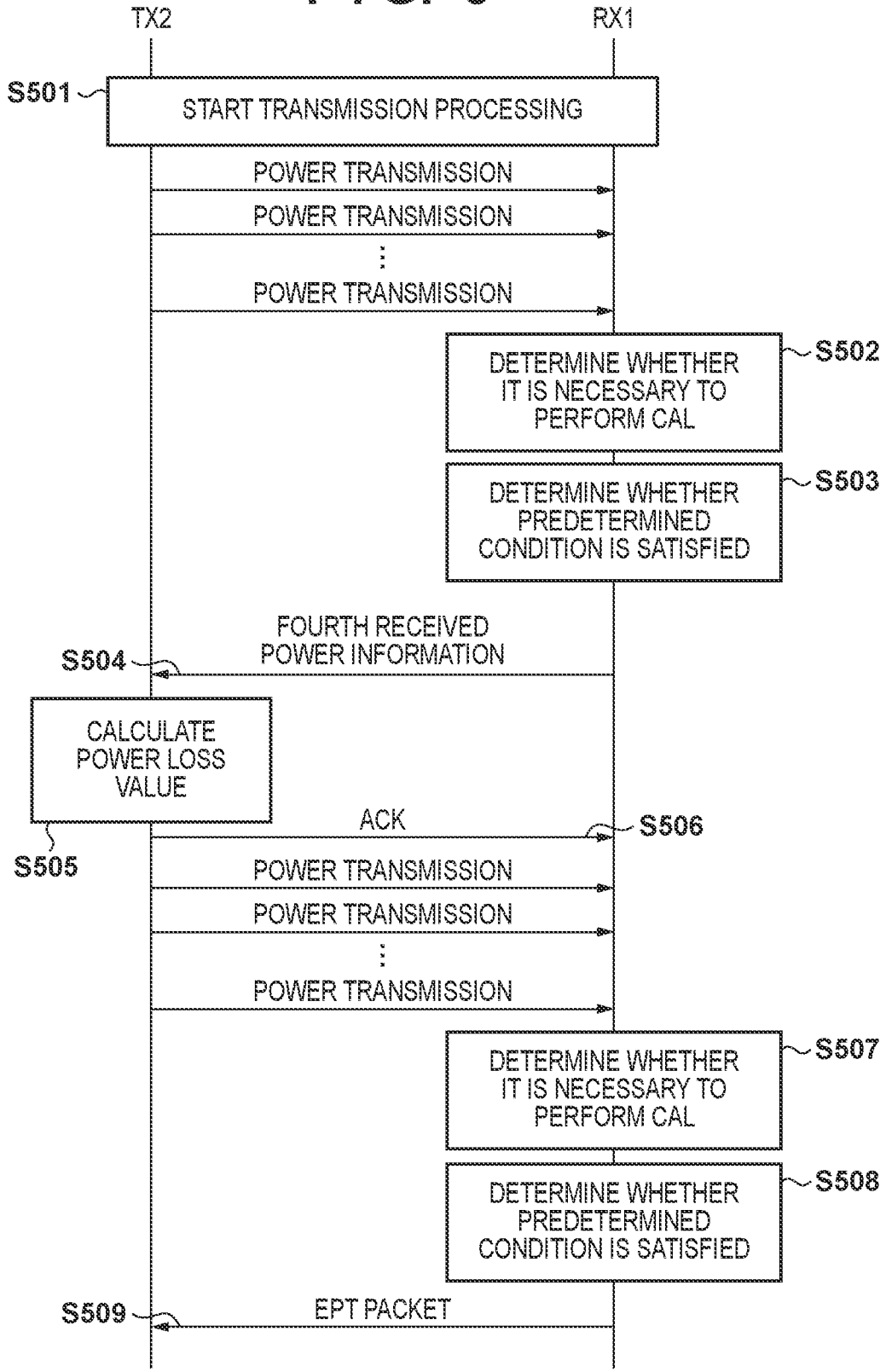

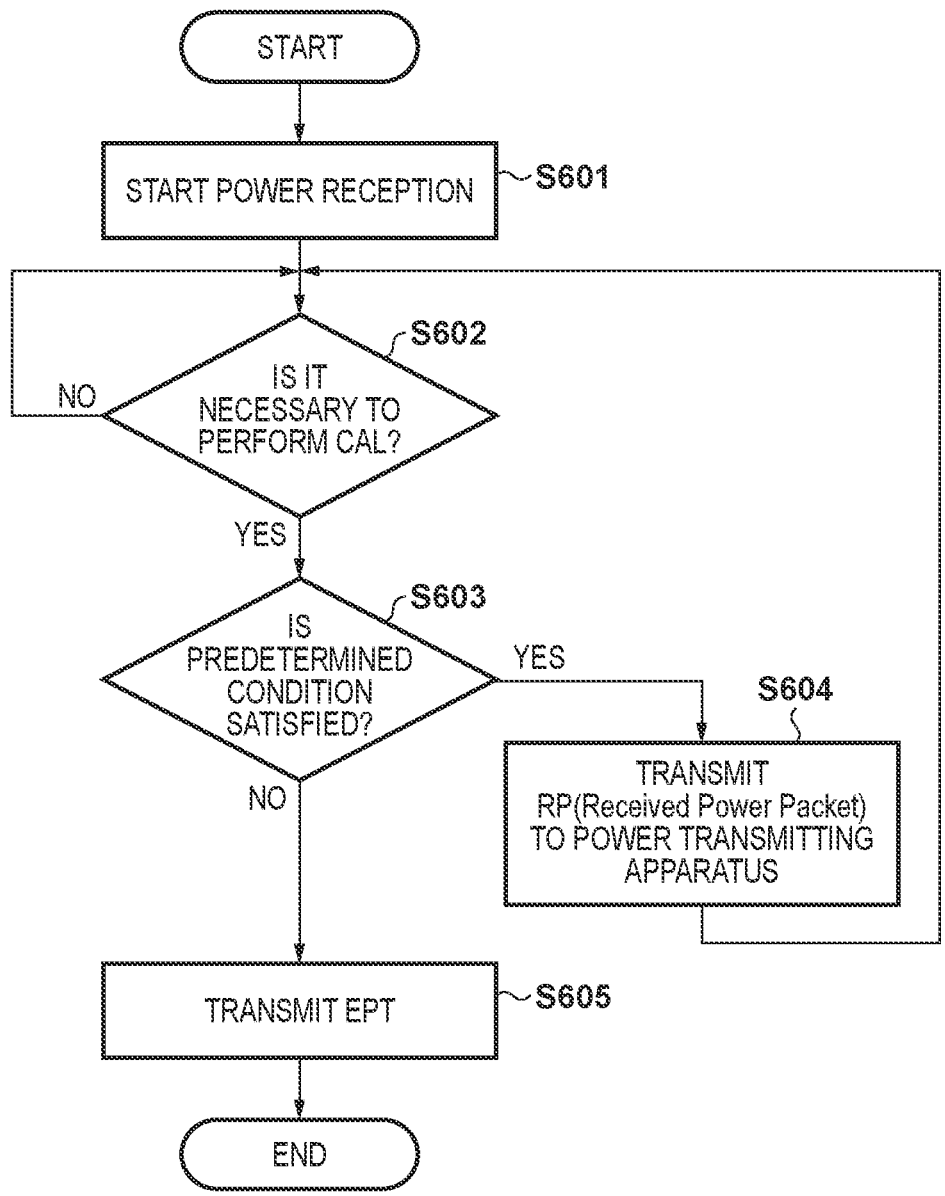

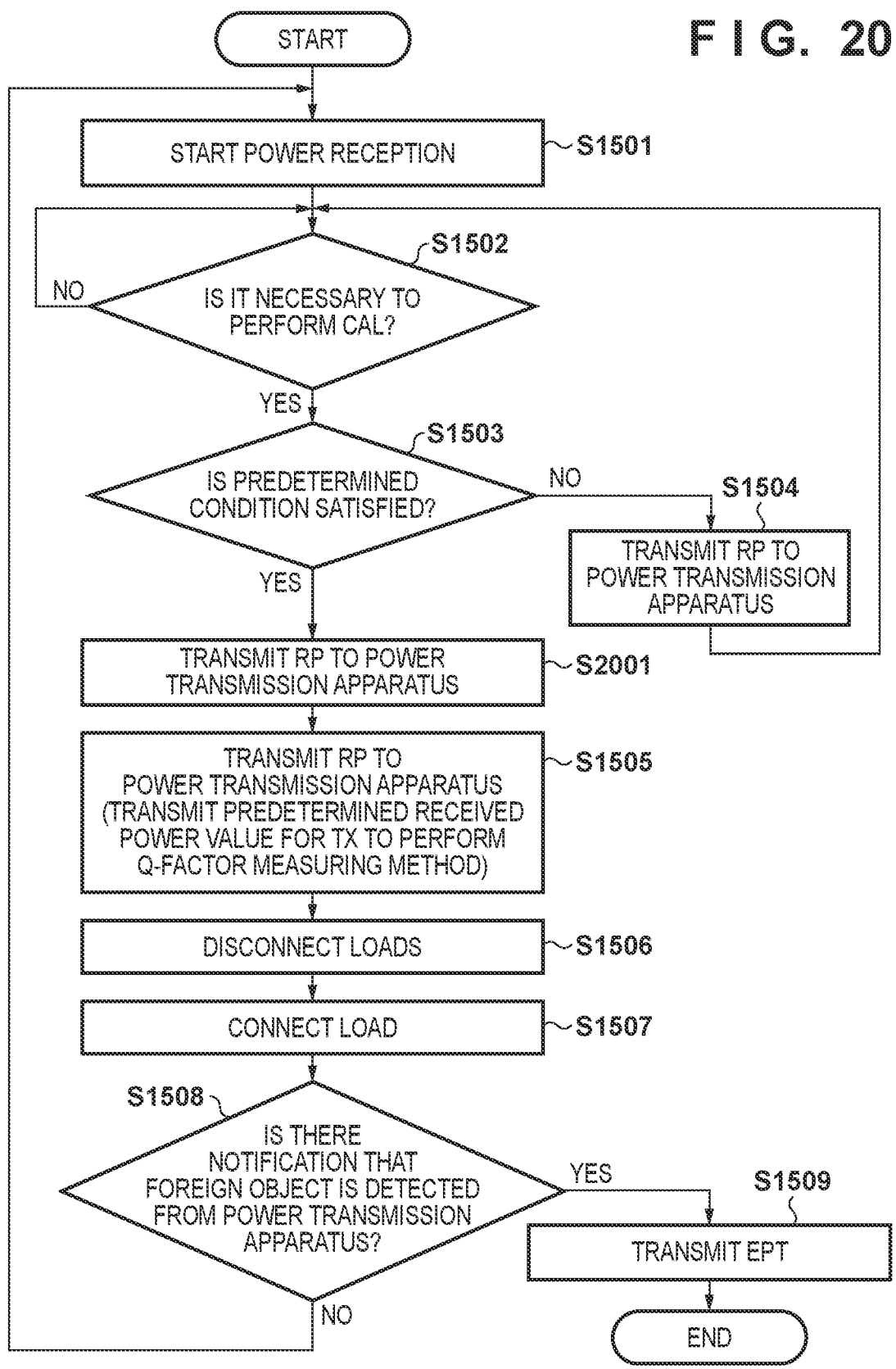

POWER RECEIVING APPARATUS, POWER TRANSMITTING APPARATUS, CONTROL METHODS THEREOF, AND A NON-TRANSITORY COMPUTER-READABLE STORAGE MEDIUM

CROSS-REFERENCE TO RELATED APPLICATIONS

This application is a Continuation, and claims the benefit, or U.S. patent application Ser. No. 17/886,912, presently pending and filed on Aug. 12, 2022, which is a Bypass Continuation of International Patent Application No. PCT/JP2021/002605, filed Jan. 26, 2021, which claims the benefit of Japanese Patent Application No. 2020-022673 filed Feb. 13, 2020, both of which are hereby incorporated by reference herein in their entireties.

BACKGROUND

Technical Field

The present disclosure relates to a power receiving apparatus, a power transmitting apparatus, control methods thereof, and a non-transitory computer-readable storage medium.

Background Art

In recent years, technology development of wireless power transfer systems has widely been conducted. Japanese Patent Laid-Open No. 2015-056959 discloses a power transmitting apparatus and a power receiving apparatus, which comply with a standard (to be referred to as a Wireless Power Consortium standard (WPC standard) hereinafter) formulated by the Wireless Power Consortium that is a standardization organization for wireless charging standards. Also, Japanese Patent Laid-Open No. 2017-070074 discloses foreign object detection in the WPC standard.

In the WPC standard, a foreign object detection method called a Power Loss method is employed. In the Power Loss method, first, based on the difference between transmission power from the power transmitting apparatus and received power in the power receiving apparatus, a power loss in a state in which a foreign object does not exist between the power transmitting apparatus and the power receiving apparatus is calculated in advance. The power transmitting apparatus executes calibration processing to set the calculated value to the power loss in the normal state (the state in which a foreign object does not exist) during power transmission processing. Then, if the power loss between the power transmitting apparatus and the power receiving apparatus, which is calculated during power transmission after that, deviates by a threshold or more from the power loss in the normal state serving as the reference, it is determined that "a foreign object exists".

Here, although a foreign object exists between the power transmitting apparatus and the power receiving apparatus in fact, the above-described calibration processing is sometimes executed assuming that the foreign object does not exist. In this case, since the presence/absence of a foreign object is determined based on the power loss in a state in which a foreign object exists, the detection accuracy of foreign object detection by the power transmitting apparatus lowers.

The present disclosure has been made in consideration of the above-described problem, and has as its object to suppress lowering of the detection accuracy of foreign object detection.

SUMMARY

In order to solve the above-described problem, according to one aspect of the present disclosure, there is provided a power receiving apparatus comprising power receiving unit configured to wirelessly receive power transmitted from a power transmitting apparatus capable of executing first foreign object detection and second foreign object detection, first transmitting unit configured to transmit, to the power transmitting apparatus, data to be used by the power transmitting apparatus to execute the first foreign object detection, determination unit configured to, before the first transmitting unit transmits the data, determining whether a predetermined condition for the power transmitting apparatus to execute the second foreign object detection different from the first foreign object detection is satisfied, and second transmitting unit configured to transmit, to the power transmitting apparatus, a signal for causing the power transmitting apparatus to execute the second foreign object detection in accordance with the determination of the determination unit.

Further features of the present disclosure will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the present disclosure and, together with the description, serve to explain principles of the present disclosure.

FIG. 5 is a sequence chart showing processing, in a Power Transfer phase, of the power transferring system according to the first embodiment.

FIG. 6 is a flowchart showing processing, in the Power Transfer phase, of the power receiving apparatus according to the first embodiment.

FIG. 20 is a flowchart showing processing, in the Power Transfer phase, of a power receiving apparatus according to the fifth embodiment;

DESCRIPTION OF EMBODIMENTS

Figure 1:
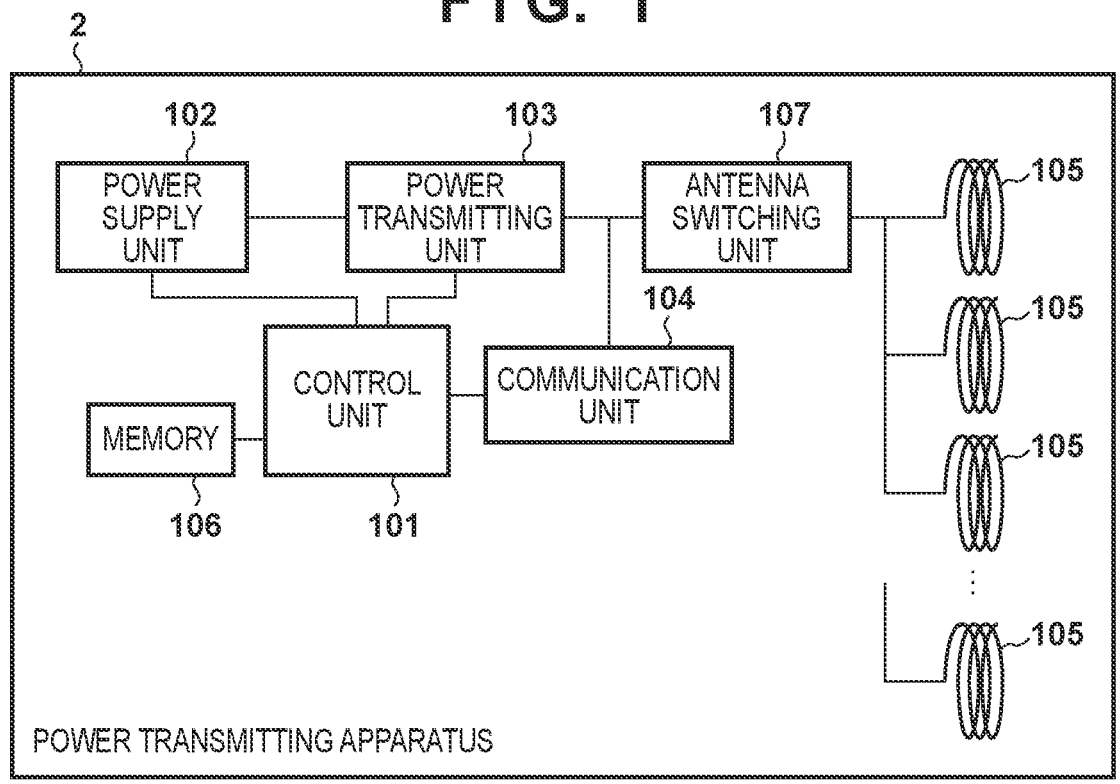
FIG. 1 is a view showing the configuration of a power transmitting apparatus according to the first embodiment.

Hereinafter, embodiments will be described in detail with reference to the attached drawings. Note, the following embodiments are not intended to limit the scope of the present disclosure. Multiple features are described in the embodiments, but limitation is not made the present disclosure that requires all such features, and multiple such features may be combined as appropriate. Furthermore, in the attached drawings, the same reference numerals are given to the same or similar configurations, and redundant description thereof is omitted.

First Embodiment

<1. Foreign Object Detection Based on Power Loss Method>

Figure 11:
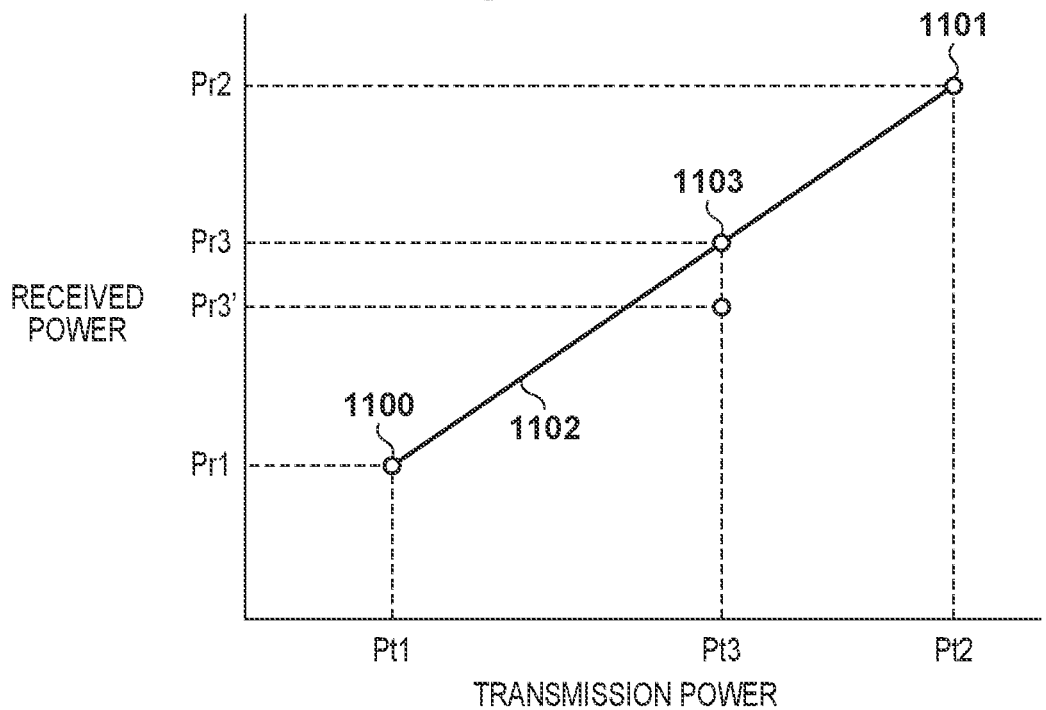
FIG. 11 is a view showing foreign object detection based on a Power Loss method.

Foreign object detection (to be referred to as first foreign object detection hereinafter) based on a Power Loss method defined by the Wireless Power Consortium standard (WPC standard) will be described with reference to FIG. 11. The abscissa of FIG. 11 represents transmission power of a power transmitting apparatus, and the ordinate represents received power of a power receiving apparatus. Note that a foreign object is an object that is not the power receiving apparatus and, for example, an object with conductivity, such as a metal piece.

First, the power transmitting apparatus transmits power of a first transmission power value Pt1 to the power receiving apparatus. Here, the power receiving apparatus receives power of a first received power value Pr1 (to be referred to as a Light Load state). Here, the power transmitting apparatus stores the first transmission power value Pt1. Here, the first transmission power value Pt1 or the first received power value Pr1 is minimum power. Also, here, the power receiving apparatus controls loads such that the received power becomes the minimum power. For example, the power receiving apparatus may disconnect the loads such that the received power is not supplied to the loads (a charging circuit and a battery, and the like).

Subsequently, the power receiving apparatus reports the power value Pr1 of the first received power to the power transmitting apparatus. The power transmitting apparatus that has received Pr1 from the power receiving apparatus can calculate the power loss between the power transmitting apparatus and the power receiving apparatus as Pt1−Pr1 (Ploss1) and create a calibration point 1100 (point 1100) representing the correspondence between Pt1 and Pr1.

Next, the power transmitting apparatus changes the transmission power value to a second transmission power value Pt2 and transmits power to the power receiving apparatus. Here, the power receiving apparatus receives power of a second received power value Pr2 (to be referred to as a Connected Load state). Here, the power transmitting apparatus stores the second transmission power value Pt2. Here, the second transmission power value Pt2 or the second received power value Pr2 is maximum power. Also, here, the power receiving apparatus controls the loads such that the received power becomes the maximum power. For example, the power receiving apparatus connects the loads such that the received power is supplied to the loads.

Subsequently, the power receiving apparatus reports Pr2 to the power transmitting apparatus. The power transmitting apparatus that has received Pr2 from the power receiving apparatus can calculate the power loss between the power transmitting apparatus and the power receiving apparatus as Pt2−Pr2 (Ploss2) and create a calibration point 1101 (point 1101) representing the correspondence between Pt2 and Pr2.

Then, the power transmitting apparatus linearly interpolates the point 1100 and the point 1101, thereby creating a line 1102. The line 1102 represents the relationship between the transmission power and the received power in a state in which no foreign object exists around the power transmitting apparatus and the power receiving apparatus. Hence, the power transmitting apparatus can predict, based on the line 1102, a power value that the power receiving apparatus receives in a case where predetermined power is transmitted in a state in which no foreign object exists. For example, if the power transmitting apparatus transmits power of a third transmission power value Pt3, it can be estimated, based on a point 1103 on the line 1102 where the transmission power value is Pt3, that the third received power value received by the power receiving apparatus in a case where power of Pt3 is transmitted is Pr3.

As described above, based on a plurality of combinations of the transmission power values of the power transmitting apparatus and the received power values of the power receiving apparatus for different loads, the power loss between the power transmitting apparatus and the power receiving apparatus for different loads can be obtained. It is also possible to estimate the power loss between the power transmitting apparatus and the power receiving apparatus for all loads by interpolating the plurality of combinations. Calibration processing thus performed by the power transmitting apparatus and the power receiving apparatus to cause the power transmitting apparatus to obtain the combination of the transmission power value and the received power value will be referred to as Calibration processing (CAL processing) below.

Here, assume that when the power transmitting apparatus actually transmits power of Pt3 to the power receiving apparatus, the power transmitting apparatus receives a received power value Pr3' from the power receiving apparatus. The power transmitting apparatus calculates Pr3−Pr3' (=Ploss_FO) that is a value obtained by subtracting the received power value Pr3' actually received from the power receiving apparatus from the received power value Pr3 in a state in which a foreign object does not exist. Ploss_FO can be considered as a power loss consumed by a foreign object when the foreign object exists between the power transmitting apparatus and the power receiving apparatus. Hence, if the power Ploss_FO that would be consumed by the foreign object exceeds a predetermined threshold, it can be determined that a foreign object exists. Alternatively, the power transmitting apparatus obtains, in advance, a power loss Pt3−Pr3 (Ploss3) between the power transmitting apparatus and the power receiving apparatus from the received power value Pr3 in a state in which a foreign object does not exist. Next, the power transmitting apparatus obtains a power loss Pt3−Pr3' (Ploss3') between the power transmitting apparatus and the power receiving apparatus in a state in which a foreign object exists from the received power value Pr3' received from the power receiving apparatus in a state in which a foreign object exists. Then, the power Ploss_FO that would be consumed by the foreign object may be estimated by Ploss3'−Ploss3 (=Ploss_FO).

As described above, as a method of obtaining the power Ploss_FO that would be consumed by the foreign object, it may be obtained as Pr3−Pr3' (=Ploss_FO) or as Ploss3'−Ploss3 (=Ploss_FO). In the following specification, basically, the method of obtaining the power as Ploss3'−Ploss3 (=Ploss_FO) will be described. This can also be applied to the method of obtaining the power as Pr3−Pr3' (=Ploss_FO). Foreign object detection based on the Power Loss method has been described above.

In the above-described CAL processing, the power receiving apparatus transmits the received power value to the power transmitting apparatus. The received power value needs to be a received power value in a state in which no foreign object exists between the power transmitting apparatus and the power receiving apparatus. Only in a case in which no foreign object exists, foreign object detection by the accurate Power Loss method can be performed. In fact, however, when the power receiving apparatus measures the received power value, a foreign object may exist between the power transmitting apparatus and the power receiving apparatus. In this case, the accuracy of foreign object detection degrades. Hence, in this embodiment, a method of preventing CAL processing from being performed in a state in which a foreign object exists between the power transmitting apparatus and the power receiving apparatus and the foreign object detection accuracy by the Power Loss method from lowering will be described.

<2. System Configuration>

Figure 12:
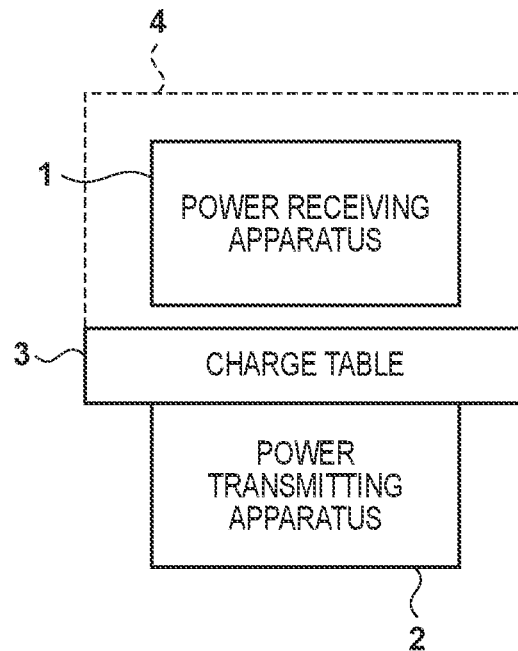
FIG. 12 is a view showing the configuration of a wireless power transferring system according to the first embodiment.

FIG. 12 shows an example of the configuration of a wireless power transferring system (wireless charging system) according to this embodiment. In an example, this system is configured to include a power receiving apparatus 1 and a power transmitting apparatus 2. The power receiving apparatus 1 will also be referred to as an RX 1, and the power transmitting apparatus as a TX 2 hereinafter. The RX 1 is an apparatus capable of receiving power transmitted from the TX 2 and, in an example, is an electronic device that charges an internal battery with the received power. The TX 2 is an electronic device that wirelessly transmits power to the RX 1 placed on a charge table 3 that is a part of the TX 2. Since the charge table 3 is a part of the TX 2, "placed on the charge table 3" will sometimes be expressed as "placed on the TX 2" hereinafter. Reference numeral 4 denotes a range in which the RX 1 can receive power from the TX 2. Note that the RX 1 and the TX 2 can have a function of executing an application other than wireless charging. An example of the RX 1 is a smartphone, and an example of the TX 2 is an accessory device configured to charge the smartphone. The RX 1 and the TX 2 may each be a tablet or a storage device such as a hard disk drive or a memory device, or may be an information processing apparatus such as a personal computer (PC). Alternatively, the RX 1 and the TX 2 may be, for example, an image input device such as an image capturing device (a camera or a video camera) or a scanner, or an image output device such as a printer, a copying machine, or a projector. Also, the TX 2 may be a smartphone. In this case, the RX 1 may be another smartphone or a wireless earphone. Also, the RX 1 may be a vehicle such as an automobile, and the TX 2 may be a charger installed on the console or the like of an automobile.

This system performs wireless power transferring using an electromagnetic induction method for wireless charging based on the WPC standard. That is, the RX 1 and the TX 2 perform wireless power transferring for wireless charging based on the WPC standard between the power receiving antenna of the RX 1 and the power transmitting antenna of the TX 2. Note that the wireless power transferring method applied to this system is not limited to the method defined by the WPC standard, and may be another electromagnetic induction method, a magnetic field resonance method, an electric field resonance method, a microwave method, or a method using a laser or the like. Also, in this embodiment, wireless power transferring is used for wireless charging. However, wireless power transferring may be performed for an application purpose other than wireless charging.

<3. Control Procedure for Power Transferring>

The RX 1 and the TX 2 according to this embodiment perform communication for power transmission/reception control based on the WPC standard. The WPC standard defines a plurality of phases including a Power Transfer phase in which power transferring is executed and one or more phases before actual power transferring is performed, and communication for power transmission/reception control necessary in each phase is performed.

Figure 13:
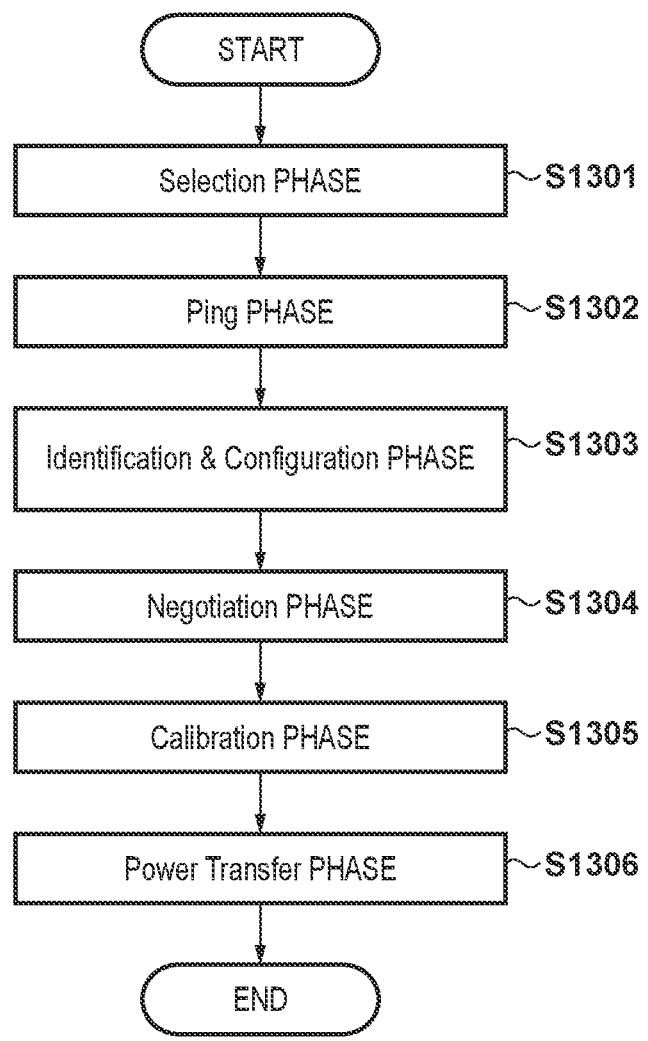
FIG. 13 is a flowchart showing processing of the power transferring system according to the first embodiment.

FIG. 13 shows a sequence for performing power transferring. The phases before power transferring can include, after placement of the RX 1 on the TX 2, a Selection phase (step S1301), a Ping phase (step S1302), an Identification and Configuration phase (step S1303), a Negotiation phase (step S1304), and a Calibration phase (step S1305). Note that the Identification and Configuration phase will be referred to as an I&C phase hereinafter.

In the Selection phase (step S1301), the TX 2 intermittently transmits an Analog Ping, and detects that an object is placed on the charge table 3 of the TX 2 (for example, that the RX 1 or a conductor piece is placed on the charge table 3). The TX 2 detects at least one of the voltage value and the current value of the power transmitting antenna at the time of Analog Ping transmission, judges that an object exists if the voltage value is less than a certain threshold or the current value exceeds a certain threshold, and transits to the Ping phase.

In the Ping phase, the TX 2 transmits a Digital Ping whose power is larger than the Analog Ping. As for the magnitude of the Digital Ping, the power is large enough to activate the control unit of the RX 1 placed on the TX 2. The RX 1 notifies the TX 2 of the magnitude of the received voltage. In this way, the TX 2 receives the response from the RX 1 that has received the Digital Ping, thereby recognizing that the object detected in the Selection phase is the RX 1. Upon receiving the notification of the received voltage value, the TX 2 transits to the I&C phase. Also, before the Digital Ping is transmitted, the TX 2 may measure the Q-Factor of the power transmitting antenna (power transmitting coil). The measurement result is used when executing foreign object detection processing (second foreign object detection) using a Q-Factor measuring method (Quality Factor method).

In the I&C phase, the TX 2 identifies the RX 1, and obtains device configuration information (capability information) from the RX 1. To do this, the RX 1 transmits an ID Packet and a Configuration Packet to the TX 2. The ID Packet includes identifier information of the RX 1, and the Configuration Packet includes the device configuration information (capability information) of the RX 1. Upon receiving the ID Packet and the Configuration Packet, the TX 2 responds by an acknowledge (ACK, acknowledgement). Then, the I&C phase ends.

In the Negotiation phase, the value of Guaranteed Power (to be referred to as a "GP" hereinafter) is decided based on the value of GP requested by the RX 1, the power transmission capability of the TX 2, and the like. In addition, the TX 2 executes foreign object detection (second foreign object detection) using the Q-Factor measuring method (Quality Factor method) in accordance with a request from the RX 1. Also, the WPC standard defines a method of, after temporarily shifting to the Power Transfer phase, performing the same processing as in the Negotiation phase again in accordance with a request from the RX 1. The phase for performing these processes after shifting from the Power Transfer phase is called a Renegotiation phase.

In the Calibration phase, the above-described CAL processing is executed based on the WPC standard. In addition, the RX 1 notifies the TX 2 of a predetermined received power value (the received power value in the light load state/the received power value in the maximum load state), and adjustment is performed to allow the TX 2 to efficiently transmit power. The received power value notified to the TX 2 can be used for foreign object detection processing (first foreign object detection) by the Power Loss method.

In the Power Transfer phase, control is performed to start or continue power transmission or stop power transmission due to an error or full charge. Also, in this embodiment, even in the Power Transfer phase, CAL processing is executed as needed, as will be described later. For the power transmission/reception control, using the same power transmitting antenna (power transmitting coil) and the same power receiving antenna (power receiving coil) as those used when performing wireless power transfer, the TX 2 and the RX 1 perform communication to superimpose a signal on an electromagnetic wave transmitted from the power transmitting antenna or the power receiving antenna. Note that the range in which communication between the TX 2 and the RX 1 is possible is almost the same as the power transmission enable range of the TX 2. In an example, communication between the TX 2 and the RX 1 is based on the WPC standard.

In the WPC standard, the magnitude of power guaranteed when the RX 1 receives power from the TX 2 is defined by a value called GP. The GP represents a power value guaranteed to be output to the loads (for example, a circuit for charging and a battery) of the RX 1 even if, for example, the positional relationship between the RX 1 and the TX 2 varies, and the power transmission efficiency between the power receiving antenna and the power transmitting antenna lowers. For example, if the GP is 5 W, even if the positional relationship between the power receiving antenna and the power transmitting antenna varies, and the power transmission efficiency lowers, the TX 2 controls such that 5 W can be output to the loads in the RX 1, and performs power transmission.

Also, the WPC standard defines methods with which the TX 2 detects that an object (foreign object) that is not the power receiving apparatus exists around the TX 2 (near the power receiving antenna). More specifically, the Power Loss method (first foreign object detection) of detecting a foreign object based on the difference between the transmission power value of the TX 2 and the received power value of the RX 1, and the Q-Factor measuring method (second foreign object detection) of detecting a foreign object based on the change of the quality coefficient (Q-Factor) of the power transmitting antenna of the TX 2 are defined. After the above-described CAL processing is performed, foreign object detection by the Power Loss method is executed during power transferring (power transmission) (the Power Transfer phase to be described later) based on the data. Also, foreign object detection by the Q-Factor measuring method is executed before power transferring (before Digital Ping transmission to be described later, or in the Negotiation phase or Renegotiation phase).

<4. Processing Sequence for Power Transferring>

Figure 4A:
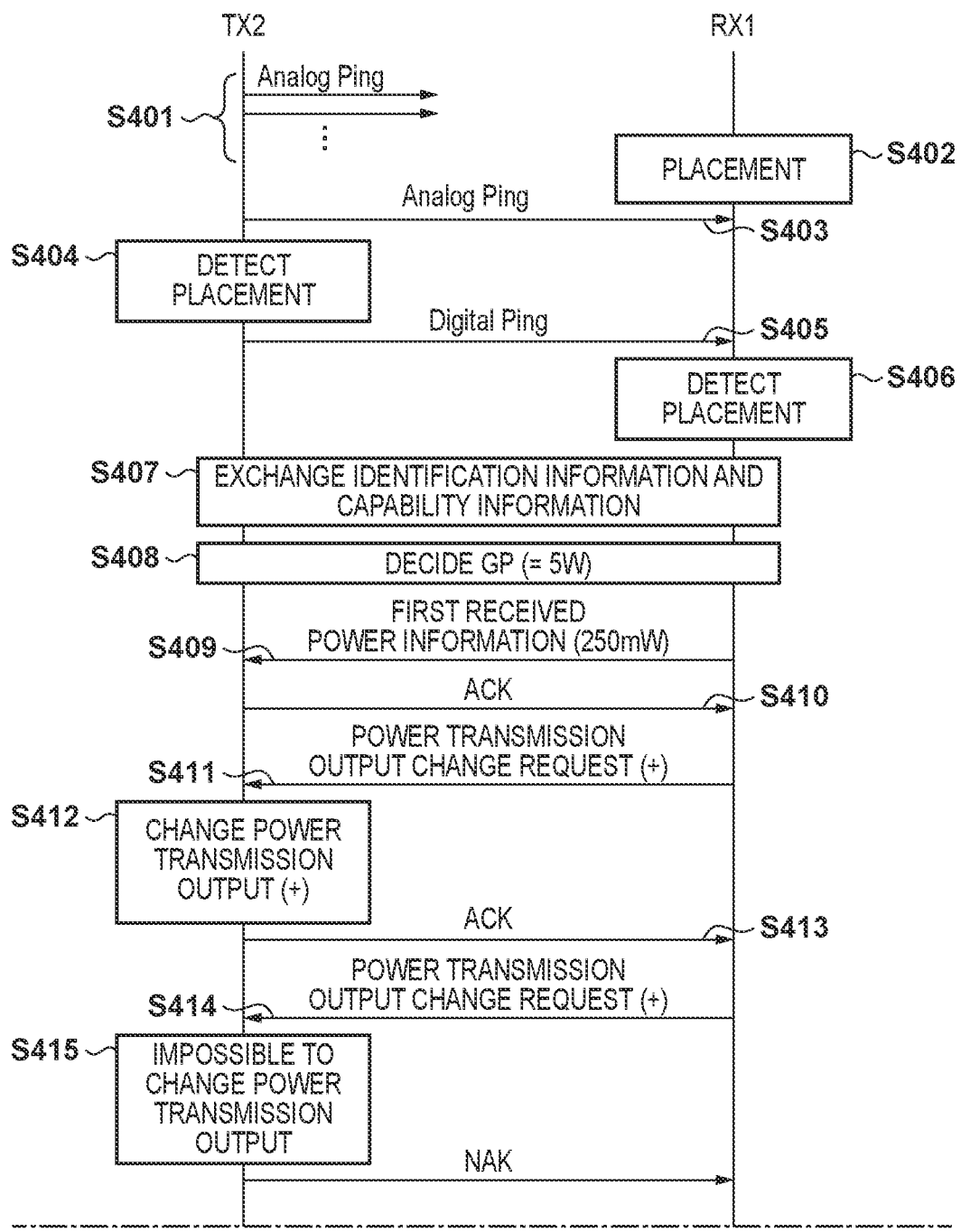
FIG. 4A is a sequence chart showing processing of a power transferring system according to the first embodiment.
Figure 4B:
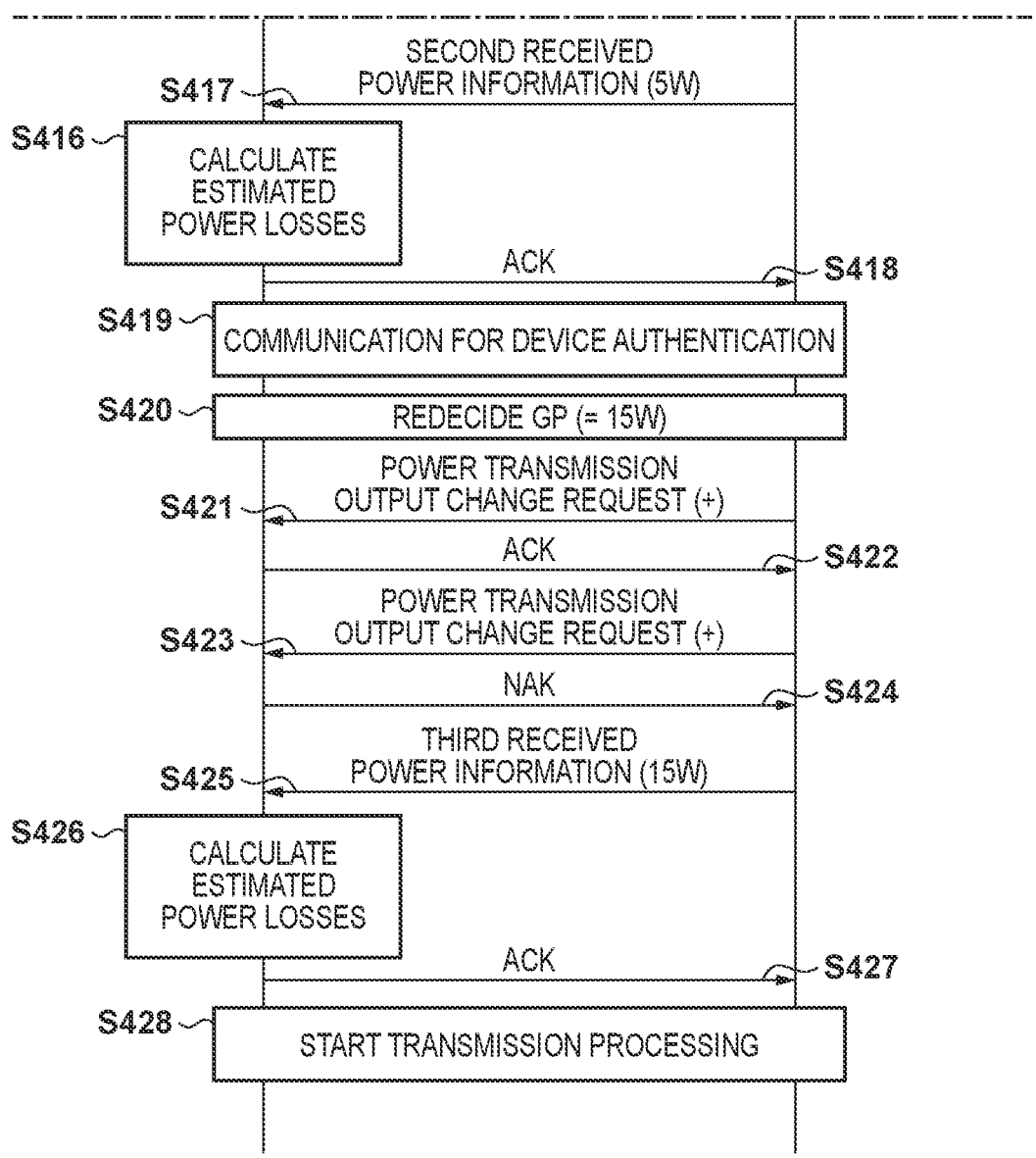
FIG. 4B is a sequence chart showing processing of the power transferring system according to the first embodiment.

The operations of the TX 2 and the RX 1 in steps S1301 to S1306 of FIG. 13 will be described next with reference to sequence charts shown in FIGS. 4A and 4B.

To detect an object existing in the power transmission enable range, the TX 2 intermittently transmits the Analog Ping of the WPC standard (step S401). The TX 2 executes processing defined as the Selection phase and the Ping phase of the WPC standard, and waits for placement of the RX 1.

To charge the RX 1 (for example, a smartphone), the user of the RX 1 brings the RX 1 close to the TX 2 (step S402). More specifically, a method of stacking the RX 1 on the TX 2 can be considered. Upon detecting that an object exists in the power transmission enable range (steps S403 and S404), the TX 2 transmits the Digital Ping of the WPC standard (step S405). Upon receiving the Digital Ping, the RX 1 can grasp that the TX 2 has detected the RX 1 (step S406). In addition, upon receiving a predetermined response to the Digital Ping, the TX 2 determines that the detected object is the RX 1, and that the RX 1 is placed on the charge table 3.

Upon detecting the placement of the RX 1, the TX 2 obtains identification information and capability information from the RX 1 by communication in the I&C phase defined by the WPC standard (step S407). Here, the identification information of the RX 1 includes a Manufacturer Code and a Basic Device ID. Also, the capability information of the RX 1 includes information capable of specifying the version of the WPC standard that the RX 1 supports, a value (Maximum Power Value) representing maximum power that the RX 1 can receive, and information representing whether the RX 1 has the Negotiation function of the WPC standard. Note that the TX 2 may obtain the identification information and the capability information of the RX 1 by a method other than the communication in the I&C phase of the WPC standard. Also, the identification information may be another arbitrary identification information capable of identifying the individual of the RX 1, such as a Wireless Power ID. As the capability information, information other than those described above may be included.

Next, the TX 2 decides the value of GP with the RX 1 by communication in the Negotiation phase defined by the WPC standard (step S408). Note that in step S408, not the communication in the Negotiation phase of the WPC standard but another procedure for deciding GP may be executed. Also, if information representing that the RX 1 does not support the Negotiation phase is obtained (in, for example, step S407), the TX 2 may be set the value of GP to a small value (for example, defined by the WPC standard in advance) without performing communication in the Negotiation phase. In this embodiment, GP=5 watt (5 W).

After decision of GP, the TX 2 performs the above-described CAL processing based on the GP. In the CAL processing, the RX 1 transmits, to the TX 2, information including received power in the light load state (to be referred to as first received power information hereinafter) (step S409). The first received power information in this embodiment is data corresponding to the received power of the RX 1 in a case where the transmission power of the TX 2 is 250 mW. A description will be made assuming that the first received power information is a received power packet (RP packet) including Received Power (mode1) defined by the WPC standard. However, another message may be used. The TX 2 determines, based on the power transmission state of the TX 2, whether to accept the first received power information. Here, if first received power information including data corresponding to the received power more than the transmission power is received, the TX 2 may determine not to accept the first received power information. Alternatively, if the ratio of the received power to the transmission power is less than a threshold, the TX 2 may determine not to accept the first received power information. If the first received power information is accepted, the TX 2 transmits an acknowledgement (ACK) to the RX 1. If the first received power information is not accepted, the TX 2 transmits a negative acknowledgement (NAK) to the RX 1 (step S410).

Next, upon receiving the ACK from the TX 2 (step S410), the RX 1 determines whether it can receive larger power. If possible, to increase the transmission power from the TX 2, the RX 1 transmits a power transmission output change instruction including a positive value (step S411). The TX 2 receives the above-described power transmission output change instruction, and if it can handle the increase of transmission power, responds by an ACK and increases the transmission power (steps S412 and S413). Since the GP is set to 5 W in step S408, transmission of the power transmission output change request (+) like steps S411 and S414 is repeated until the transmission power reaches 5 W.

If the TX 2 receives a power increase request more than the GP from the RX 1 (step S414), the TX 2 responds to the power transmission output change instruction by a NAK, thereby suppressing power transmission more than specified (step S415). Upon receiving the NAK from the TX 2 and thus judging that the received power has reached the specified value, the RX 1 transmits, to the TX 2, data including the received power in a load connected state as second received power information (step S417). In this embodiment, since the GP is 5 W, the second received power information is the received power information of the RX 1 when the transmission power of the TX 2 is 5 W. Here, the second received power information is a received power packet including Received Power (mode2) defined by the WPC standard. However, another message may be used.

Based on the received power values included in the first received power information and the second received power information and transmission power values corresponding to first received power information and the second received power information, the TX 2 calculates power losses between the TX 2 and the RX 1 (step S416). By interpolating the power losses, power loss values between the TX 2 and the RX 1 for all transmission powers of the TX 2 (in this case, the transmission power of the TX 2 is 250 mW to 5 W) can be calculated. The TX 2 transmits an ACK to the second received power information from the RX 1 (step S418), completes the Calibration phase, and shifts to the Power Transfer phase. Upon judging that charging processing can be started, the TX 2 starts power transmission processing to the RX 1, and charging of the RX 1 is started.

Next, the TX 2 and the RX 1 perform device authentication processing (step S419). If it is found that each other's devices can handle larger GP, the GP may be reset to a larger value, here, 15 W (step S420). To increase the transmission power of the TX 2 to 15 W, as described above concerning steps S411 to S413, the RX 1 and the TX 2 change the transmission power using a power transmission output change instruction, an ACK, and an NAK (steps S421 to S424 and S508). For GP=15 W, the TX 2 and the RX 1 execute CAL processing again. More specifically, the RX 1 transmits a received power packet (to be referred to as third received power information hereinafter) including data corresponding to the received power of the RX 1 in the load connected state when the transmission power of the TX 2 is 15 W (step S425).

Based on the received power values included in the first received power information, the second received power information, and the third received power information and transmission power values corresponding to these pieces of information, the TX 2 calculates power losses between the TX 2 and the RX 1 (step S426). By this, power losses for all transmission powers of the TX 2 (in this case, the transmission power of the TX 2 is 250 mW to 15 W) can be estimated. When a calibration point is created using the third received power from the RX 1, the TX 2 transmits an ACK to the RX 1 (step S427), and completes the CAL processing. Upon judging that charging processing can be started, the TX 2 starts power transmission processing to the RX 1 (step S428).

<5. Configurations of Power Transmitting Apparatus and Power Receiving Apparatus>

The configurations of the power transmitting apparatus and the power receiving apparatus according to this embodiment will be described next. Note that each configuration to be described below is merely an example, and a part (or the whole in some cases) of the configuration to be described may be replaced with another configuration that provides a similar function or may be omitted, or a further configuration may be added to the configuration be described. Furthermore, one block shown in the following description may be divided into a plurality of blocks, and a plurality of blocks may be integrated into one block. Each functional block to be described below executes a function as a software program. However, a part or whole of the functional block may be provided as hardware.

FIG. 1 is a functional block diagram showing an example of the configuration of the TX 2 according to this embodiment. The TX 2 includes a control unit 101, a power supply unit 102, a power transmitting unit 103, a communication unit 104, a power transmitting antenna 105, a memory 106, and an antenna switching unit 107. FIG. 1 shows the control unit 101, the power supply unit 102, the power transmitting unit 103, the communication unit 104, the memory 106, and the antenna switching unit 107 as separate bodies. A plurality of arbitrary functional blocks of these may be implemented in the same chip.

The control unit 101 executes a control program stored in, for example, the memory 106, thereby controlling the entire TX 2. Also, the control unit 101 performs control concerning power transmission control including communication for device authentication in the TX 2. Furthermore, the control unit 101 may perform control to execute an application other than wireless power transferring. The control unit 101 is configured to include, for example, at least one processor such as a CPU (Central Processing Unit) or an MPU (MicroProcessor Unit). Note that the control unit 101 may be formed by hardware dedicated to specific processing, such as an ASIC (Application Specific Integrated Circuit). The control unit 101 may also be configured to include an array circuit such as an FPGA (Field Programmable Gate Array) compiled to execute predetermined processing. The control unit 101 stores, in the memory 106, information that should be stored during execution of various kinds of processing. Also, the control unit 101 can measure a time using a timer (not shown).

The power supply unit 102 supplies power to each functional block. The power supply unit 102 is, for example, a commercial power supply or a battery. The battery stores power supplied from the commercial power supply.

The power transmitting unit 103 converts DC or AC power input from the power supply unit 102 into AC frequency power in a frequency band used for wireless power transferring and inputs the AC frequency power to the power transmitting antenna 105, thereby generating an electromagnetic wave to be received by the RX 1. For example, the power transmitting unit 103 converts a DC voltage supplied from the power supply unit 102 into an AC voltage by a switching circuit having a half bridge or full bridge configuration using an FET (Field Effect Transister). In this case, the power transmitting unit 103 includes a gate driver that ON/OFF-controls the FET.

The power transmitting unit 103 adjusts one or both of the voltage (transmission voltage) and the current (transmission current) input to the power transmitting antenna 105, thereby controlling the intensity of the power of the electromagnetic wave to be output. When the transmission voltage or the transmission current is made large, the intensity of the power of the electromagnetic wave increases. When the transmission voltage or the transmission current is made small, the intensity of the power of the electromagnetic wave decreases. In addition, based on an instruction from the control unit 101, the power transmitting unit 103 performs output control of the AC frequency power to start or stop power transmission from the power transmitting antenna 105. Also, the power transmitting unit 103 has a capability of supplying power to output power of 15 watt (W) to the charging unit 206 (FIG. 2) of the RX 1 supporting the WPC standard.

The communication unit 104 performs communication with the RX 1 for power transmission control based on the WPC standard as described above. The communication unit 104 modulates an electromagnetic wave transmitted from the power transmitting antenna 105 and transfers information to the RX 1, thereby performing communication. In addition, the communication unit 104 demodulates an electromagnetic wave transmitted from the power transmitting antenna 105, which is modulated by the RX 1, thereby obtaining information transmitted from the RX 1. That is, communication performed by the communication unit 104 is performed by superimposing a signal on the electromagnetic wave transmitted from the power transmitting antenna 105. Also, the communication unit 104 may communicate with the RX 1 by communication using an antenna different from the power transmitting antenna 105 and based on a standard different from the WPC standard, or may communicate with the RX 1 by selectively using a plurality of communications.

The memory 106 stores a control program and can also store the states of the TX 2 and the RX 1 (the transmission power value, the received power value, and the like). For example, the state of the TX 2 is obtained by the control unit 101 and the state of the RX 1 is obtained by a control unit 201 (FIG. 2) of the RX 1, and the states can be received via the communication unit 104.

The power transmitting antenna 105 includes a plurality of antennas (coils). The antenna switching unit 107 selects one of the plurality of antennas (coils) and switches. Alternatively, the power transmitting antenna 105 may include not a plurality of antennas but one power transmitting antenna 105. In this case, the antenna switching unit 107 is not necessary.

Figure 2:
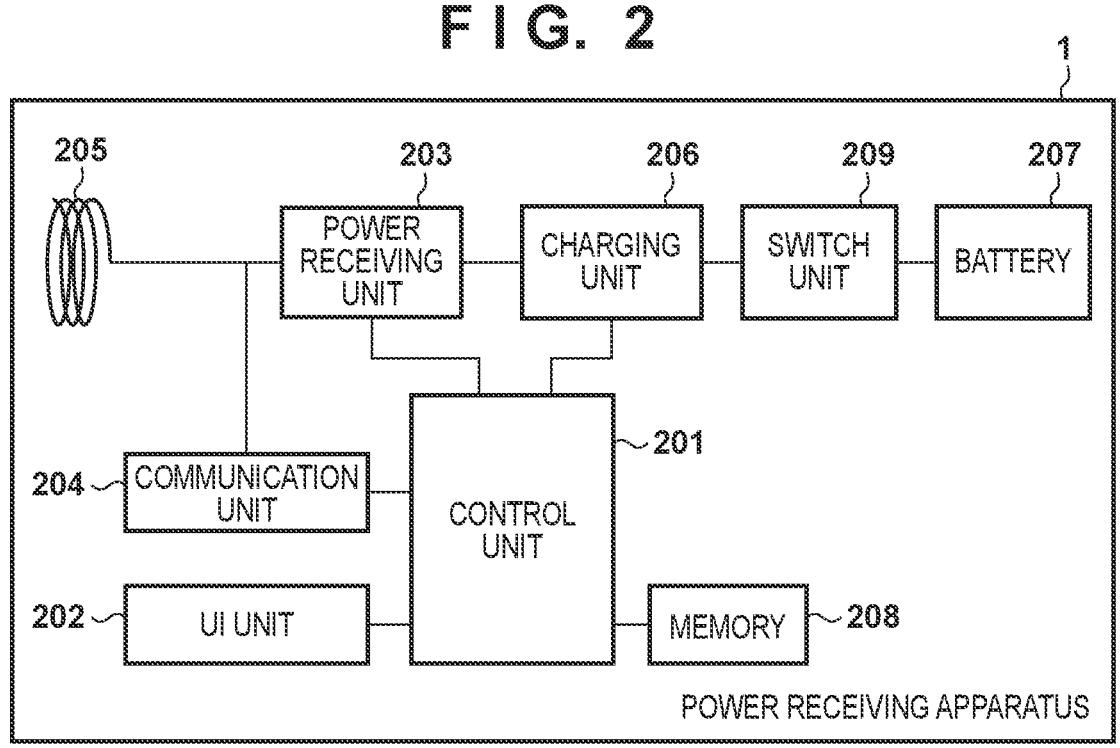
FIG. 2 is a view showing the configuration of a power receiving apparatus according to the first embodiment.

FIG. 2 is a block diagram showing an example of the configuration of the RX 1 according to this embodiment. The RX 1 includes the control unit 201, a UI (User Interface) unit 202, a power receiving unit 203, a communication unit 204, a power receiving antenna 205, a charging unit 206, a battery 207, a memory 208, and a switch unit 209. Note that the plurality of functional blocks shown in FIG. 2 may be implemented as one hardware module.

The control unit 201 executes a control program stored in, for example, the memory 208, thereby controlling the entire RX 1. That is, the control unit 201 controls each functional unit shown in FIG. 3B. Furthermore, the control unit 201 may perform control to execute an application other than wireless power transferring. An example of the control unit 201 is configured to include at least one processor such as a CPU or an MPU. Note that the control unit 201 may control the entire RX 1 (if the RX 1 is a smartphone, the entire smartphone) by cooperating with an OS (Operating System) executed by the control unit 201.

In addition, the control unit 201 may be formed by hardware dedicated to specific processing, such as an ASIC. The control unit 201 may also be configured to include an array circuit such as an FPGA compiled to execute predetermined processing. The control unit 201 stores, in the memory 208, information that should be stored during execution of various kinds of processing. Also, the control unit 201 can measure a time using a timer (not shown).

The UI unit 202 performs various kinds of outputs to the user. The various kinds of outputs here are operations such as screen display, blinking or color change of an LED, voice output by a speaker, and a vibration of the main body of the RX 1. The UI unit 202 is implemented by a liquid crystal panel, a speaker, a vibration motor, or the like.

The power receiving unit 203 obtains, by the power receiving antenna 205, AC power (an AC voltage and an AC current) generated by electromagnetic induction caused by an electromagnetic wave radiated from the power transmitting antenna 105 of the TX 2. The power receiving unit 203 converts the AC power into DC or AC power of a predetermined frequency, and outputs the power to the charging unit 206 that performs processing for charging the battery 207. That is, the power receiving unit 203 supplies power to a load in the RX 1. The above-described GP is power guaranteed to be output from the power receiving unit 203. The power receiving unit 203 has a capability of supplying power with which the charging unit 206 charges the battery 207 and supplying power to output power of 15 W to the charging unit 206. The switch unit 209 is configured to control whether to supply the received power to the battery (load). When the switch unit 209 connects the charging unit 206 and the battery 207, power received via the power receiving antenna 205 is supplied to the battery 207. That is, the switch unit 209 is a switching unit configured to switch whether to disconnect connection between the power receiving antenna 205 and the battery 207 that is a load. If the switch unit 209 disconnects, by a switch, connection between the charging unit 206 and the battery 207, received power is not supplied to the battery 207. Note that the switch unit 209 is arranged between the charging unit 206 and the battery 207 in FIG. 2 but may be arranged between the power receiving unit 203 and the charging unit 206. Alternatively, although the switch unit 209 is shown as one block in FIG. 2, the switch unit 209 can also be implemented as a part of the charging unit 206. The communication unit 204 performs communication with the communication unit 104 provided in the TX 2 for power reception control based on the WPC standard as described above. The communication unit 204 demodulates an electromagnetic wave input from the power receiving antenna 205, thereby obtaining information transmitted from the TX 2. The communication unit 204 then load-modulates the input electromagnetic wave and thus superimposes a signal concerning information to be transmitted to the TX 2 on the electromagnetic wave, thereby performing communication with the TX 2. Note that the communication unit 204 may communicate with the TX 2 by communication using an antenna different from the power receiving antenna 205 and based on a standard different from the WPC standard, or may communicate with the TX 2 by selectively using a plurality of communications.

The memory 208 stores a control program and can also store the states of the TX 2 and the RX 1. For example, the state of the RX 1 is obtained by the control unit 201, the state of the TX 2 is obtained by the control unit 101 of the TX 2, and the states can be received via the communication unit 204.

Figure 3A:
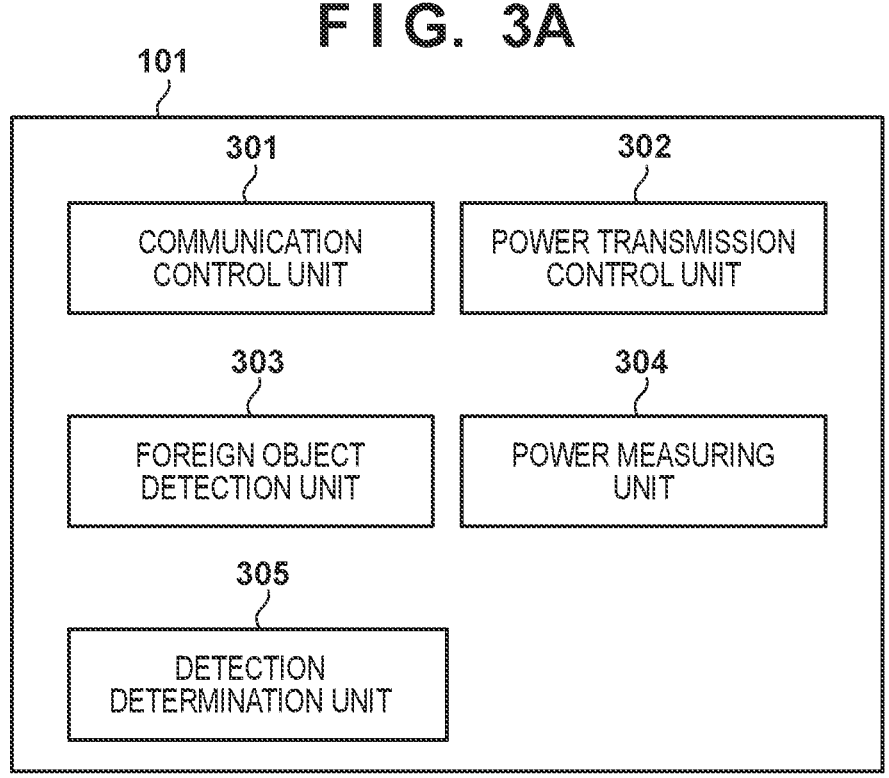
FIG. 3A is a functional block diagram of the control unit of the power transmitting apparatus according to the first embodiment.

The functional block diagram of the control unit 101 of the TX 2 will be described next with reference to FIG. 3A. The control unit 101 includes a communication control unit 301, a power transmission control unit 302, a foreign object detection unit 303, a power measuring unit 304, and a detection determination unit 305. The communication control unit 301 performs control communication with the RX 1 based on the WPC standard via the communication unit 104. For example, the communication control unit 301 receives, from the RX 1, a received power packet including data representing received power of the RX 1, and transmits a response to the received power packet. The power transmission control unit 302 controls the power transmitting unit 103 to control power transmission to the RX 1.

The foreign object detection unit 303 performs first foreign object detection based on the power loss between the power transmitting apparatus and the power receiving apparatus, and second foreign object detection by measuring the Q-Factor of the power transmitting antenna 105. In this embodiment, a description will be made assuming that the foreign object detection unit 303 performs, as the second foreign object detection, foreign object detection based on the Q-Factor measuring method. However, foreign object detection processing may be performed using another method. For example, in the TX 2 having an NFC (Near Field Communication) communication function, foreign object detection may be performed using a counter device detection function by the NFC standard. As a function other than foreign object detection, the foreign object detection unit 303 can also detect a change of the state on the TX 2. For example, an increase/decrease of the number of RXs 1 on the TX 2 may be detected. Alternatively, movement of the RX 1 on the TX 2 may be detected.

The power measuring unit 304 measures power output to the RX 1 via the power transmitting unit 103 and calculates an average output power value per unit time. The foreign object detection unit 303 performs foreign object detection processing by the Power Loss method based on the measurement result of the power measuring unit 304 and received power information received from the power receiving apparatus via the communication control unit 301. The detection determination unit 305 determines, based on at least one of the information received from the RX 1 and the power measured by the power measuring unit 304, whether to execute foreign object detection. In addition, the detection determination unit 305 may determine which one of the foreign object detection processes (at least one of first foreign object detection and second foreign object detection) should be executed.

The functions of the communication control unit 301, the power transmission control unit 302, the foreign object detection unit 303, the power measuring unit 304, and the detection determination unit 305 are implemented as programs that operate in the control unit 101. The processing units are each configured as an independent program, and can operate concurrently while making synchronization between the programs by event processing or the like.

Figure 3B:
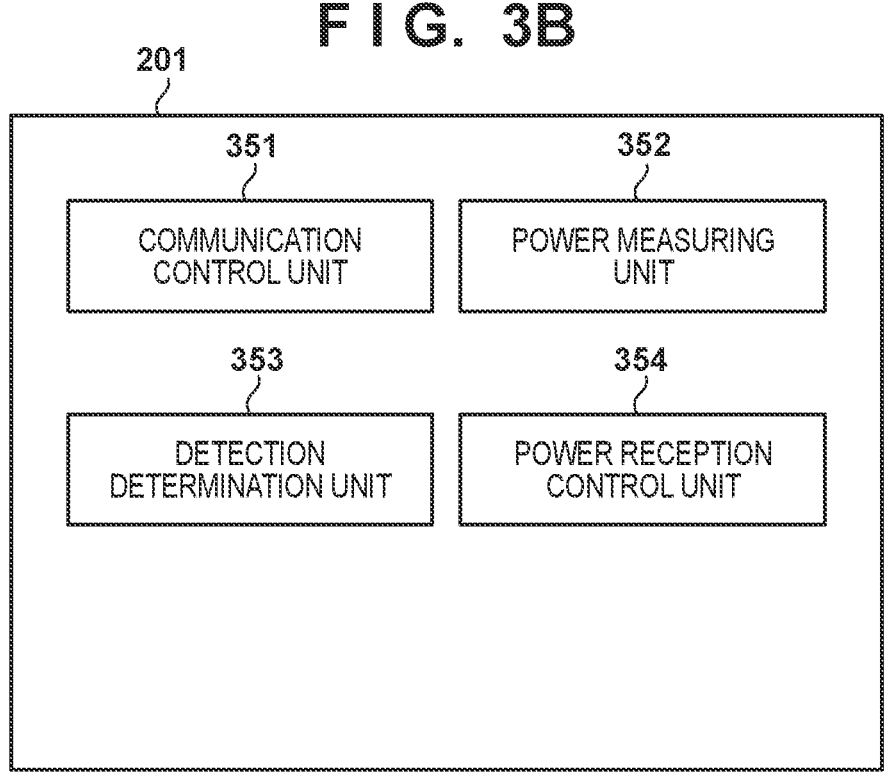
FIG. 3B is a functional block diagram of the control unit of the power receiving apparatus according to the first embodiment.

The functional block diagram of the control unit 201 of the RX 1 will be described next with reference to FIG. 3B. The control unit 201 includes a communication control unit 351, a power measuring unit 352, a detection determination unit 353, and a power reception control unit 354.

The communication control unit 351 performs control communication with the TX 2 via the communication unit 204. The power measuring unit 352 measures power received from the TX 2, and transmits data representing received power to the TX 2 via the communication control unit 351. The detection determination unit 353 determines at least one of whether it is necessary to cause the TX 2 to execute foreign object detection and whether at least one of first foreign object detection and second foreign object detection is to be executed, and transmits, via the communication control unit 351, a signal for causing the TX 2 to execute foreign object detection. The power reception control unit 354 controls the power receiving unit 203 to control power transferring with the TX 2. Also, the power reception control unit 354 controls the communication unit 204 to control the phase and parameters of power transferring.

The functions of the communication control unit 351, the power measuring unit 352, the detection determination unit 353, and the power reception control unit 354 are implemented as programs that operate in the control unit 201. The processing units are each configured as an independent program, and can operate concurrently while making synchronization between the programs by event processing or the like.

<6. Example of Processing of Power Transfer Phase>

In the Power Transfer phase, power is transmitted from the TX 2 to the RX 1. Also, a foreign object is detected by first foreign object detection. In the first foreign object detection, first, a power loss in a state in which a foreign object does not exist between the TX 2 and the RX 1 (a power loss in a normal state) is calculated in advance by the above-described CAL processing based on the difference between the transmission power of the TX 2 and the received power of the RX 1. Then, if the power loss between the TX 2 and the RX 1 calculated during power transmission later deviates by a threshold or more from the power loss in the normal state serving as the reference, the TX 2 determines that a foreign object exists.

However, although a foreign object exists between the power transmitting apparatus and the power receiving apparatus in fact, CAL processing is sometimes executed assuming that the foreign object does not exist. In this case, the presence/absence of a foreign object is determined based on the power loss in a state in which a foreign object exists, and the foreign object detection accuracy lowers. Hence, in this embodiment, processing for preventing CAL processing from being performed in a state in which a foreign object exists between the TX 2 and the RX 1 and the foreign object detection accuracy by the Power Loss method from lowering will be described.

Figure 7:
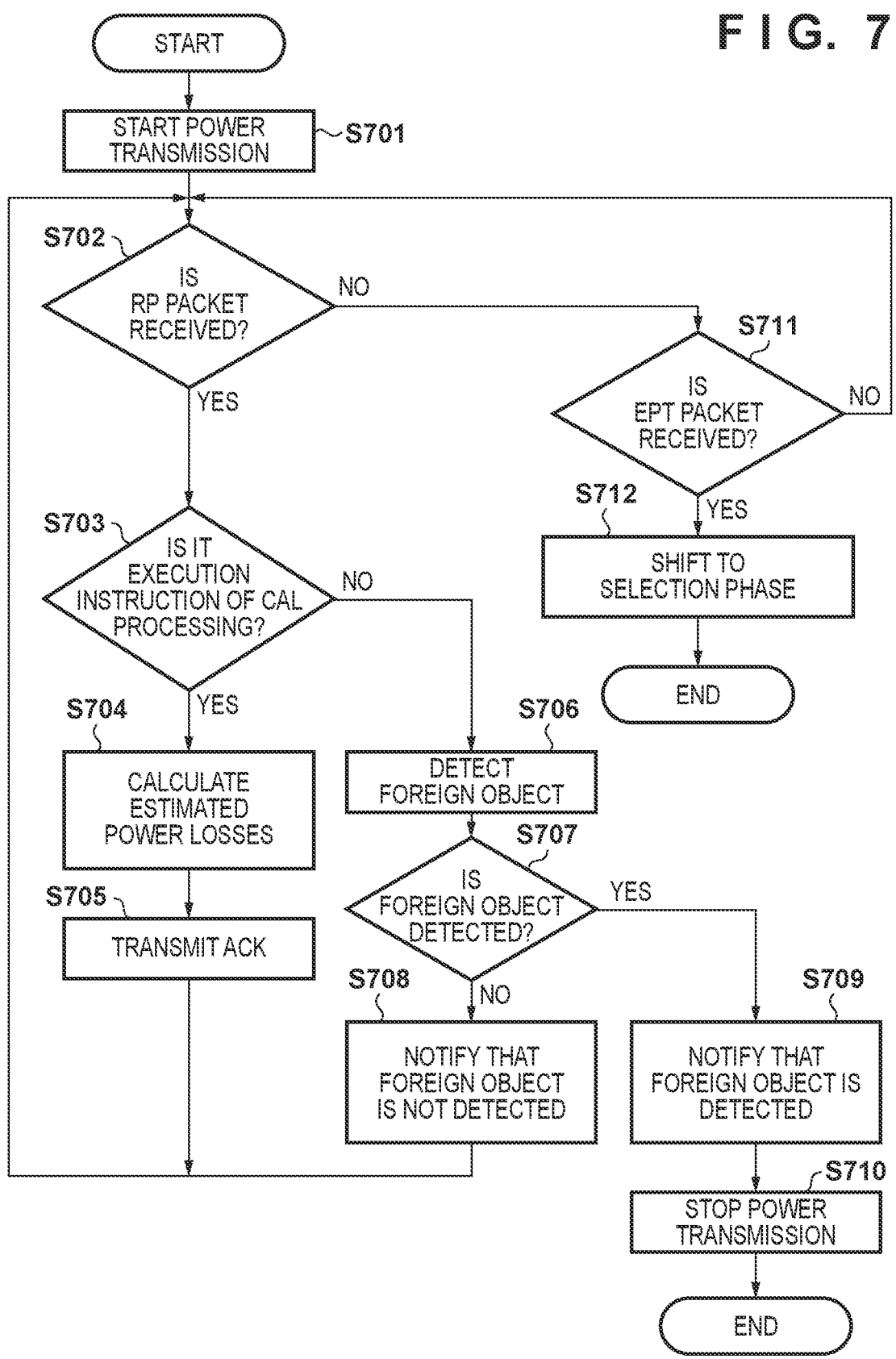
FIG. 7 is a flowchart showing processing, in the Power Transfer phase, of the power transmitting apparatus according to the first embodiment.

To execute first foreign object detection, CAL processing for obtaining data necessary for first foreign object detection is executed. Before the CAL processing is executed, the RX 1 controls such that the TX 2 checks, using second foreign object detection, whether a foreign object is on the power transmitting apparatus. This makes it possible to perform CAL processing in an appropriate state (in a state in which no foreign object exists). Operations of the TX 2 and the RX 1 for implementing this will be described with reference to a sequence shown FIG. 5, a flowchart of the power receiving apparatus shown in FIG. 6, and a flowchart of the power transmitting apparatus shown in FIG. 7.

In this embodiment, consider a case in which CAL processing is needed again during the Power Transfer phase in which power is transmitted from the TX 2 to the RX 1. After the start of power reception (S501 and steps S601 and S701), the RX 1 determines whether it is necessary to perform CAL processing (S502 and step S602). For example, to change transmission power to higher power, new calibration points (for example, 1100, 1103, and 1101 in FIG. 11) need to be created. Hence, it is determined that CAL processing needs to be executed. Alternatively, in some cases, the temperature of the TX 2 or the RX 1 rises due to power transmission from the TX 2 to the RX 1, and the characteristics of circuits or components in the TX 2 or the RX 1 vary. In this case, since a line or curve connecting the calibration points (for example, a line connecting the points 1100, 1103, and 1101 in FIG. 11) varies, the RX 1 may determine that it is necessary to execute CAL processing to update the calibration points. That is, the RX 1 may include a temperature sensor (not shown) and determine, based on the value of the temperature sensor, whether it is necessary to execute CAL processing. In this case, if the value of the temperature sensor changes by a predetermined value or more from the value in previous CAL processing, it may be determined that it is necessary to execute CAL processing. Alternatively, the RX 1 may include a timer (not shown) and determine, based on the time elapsed from the start of power reception or the time elapsed from previous CAL processing, whether it is necessary to execute CAL processing.

Next, the RX 1 determines whether a predetermined condition is satisfied (S503 and step S603). This determines whether the possibility of a foreign object between the TX 2 and the RX 1 is high (whether a predetermined condition is satisfied). For example, if a predetermined time has elapsed as a time elapsed from previous foreign object detection executed by the foreign object detection unit 303 shown in FIG. 3A, the RX 1 determines that the possibility of a foreign object between the TX 2 and the RX 1 is high. On the other hand, if the predetermined time has not elapsed, the RX 1 determines that the possibility of a foreign object between the TX 2 and the RX 1 is low. Upon determining that the possibility of a foreign object is low (NO in step S603), the RX 1 transmits the received power value of power received by the RX 1 (fourth received power information) to the TX 2 by a received power packet (RP packet) (S504 and steps S604 and S702). The TX 2 that has received the RP packet determines whether the RP packet instructs execution of CAL processing (step S703). In an example, based on the presence/absence of a CAL processing execution instruction included in the RP packet or a signal different from the RP packet or the presence/absence of a first foreign object detection execution instruction, the TX 2 determines whether the RP packet instructs execution of CAL processing. The TX 2 creates calibration points based on the received fourth received power information and transmission power corresponding to that (S505 and step S704), and transmits an ACK to the RX 1 (S506 and step S705). Here, if the TX 2 determines that the RP packet is a first foreign object detection execution instruction, the TX 2 executes first foreign object detection (step S706). If a foreign object is detected (YES in step S707), the TX 2 notifies the RX 1 of that (step S709), and stops power transmission (step S710). Upon determining that no foreign object is detected by first foreign object detection in step S706 (NO in step S707), the TX 2 notifies the RX 1 of that (step S708), and returns the process to step S702.

After step S604, after the elapse of a predetermined time, the RX 1 determines whether it is necessary to perform CAL processing again (S502 and step S602), and determines whether a predetermined condition is satisfied (S503 and step S603). This determines whether the possibility of a foreign object between the power transmitting apparatus and the power receiving apparatus is high. For example, if a predetermined time has elapsed from previous CAL processing, it is determined that the possibility of a foreign object is high. Before CAL processing, the power transmitting apparatus confirms, using a foreign object detection method different from first foreign object detection, whether a foreign object is between the TX 2 and the RX 1. To cause the TX 2 to execute the foreign object detection method different from first foreign object detection, the RX 1 transmits, for example, an EPT packet (End Power Transfer packet) to the TX 2 (S505 and steps S605 and S711).

Thus, the TX 2 ends the Power Transfer phase and shifts to the Selection phase (step S712). That is, reset to the state before power transmission is performed. Accordingly, since the power transmitting apparatus starts processing from the Selection phase again, foreign object detection (second foreign object detection) by the Q-Factor measuring method, which is executed in the Negotiation phase or the Renegotiation phase, is executed. In this way, second foreign object detection different from first foreign object detection can be performed before execution of CAL processing. Accordingly, the possibility of a foreign object between the TX 2 and the RX 1 lowers when executing CAL processing, and first foreign object detection can be executed more accurately.

Note that in this embodiment, the RX 1 transmits the EPT (End Power Transfer) packet to the TX 2 to execute second foreign object detection. However, a signal other than the EPT packet may be used to execute second foreign object detection. For example, the RX 1 may transmit, to the TX 2, a signal for instructing shift to the Renegotiation phase. Alternatively, the RX 1 may instruct the TX 2 to transit to the Selection phase not to change the reference value of second foreign object detection.

As described above, before CAL processing for first foreign object detection is executed, the RX according to this embodiment determines whether a predetermined condition to execute second foreign object detection is satisfied. Upon determining that the predetermined condition is satisfied, the RX controls the TX to execute second foreign object detection. This lowers the possibility that the CAL processing for first foreign object detection is executed in a state in which the possibility of presence of a foreign object between the TX 2 and the RX 1 is high, and makes it possible to prevent the foreign object detection accuracy by first foreign object detection from lowering.

Second Embodiment

In the first embodiment, a method has been described in which if it is determined to execute second foreign object detection before CAL processing for first foreign object detection is executed, the Power Transfer phase is ended, thereby controlling the power transmitting apparatus to perform second foreign object detection. In the second embodiment, a method will be described in which if it is determined that CAL processing necessary for execution of first foreign object detection is needed, the power transmitting apparatus is controlled to execute second foreign object detection in a shorter time. Note that a description of the same components, functions, and processes as in the first embodiment will be omitted.

For first foreign object detection, CAL processing is needed. Before CAL processing is executed, an RX 1 controls such that a TX 2 checks, using a second foreign object detection method, whether a foreign object is on the power transmitting apparatus. If CAL processing is executed during a Power Transfer phase, second foreign object detection is also performed during the Power Transfer phase. This makes it possible to check whether a foreign object exists on the power transmitting apparatus in a shorter time as compared to the first embodiment.

Figure 8:
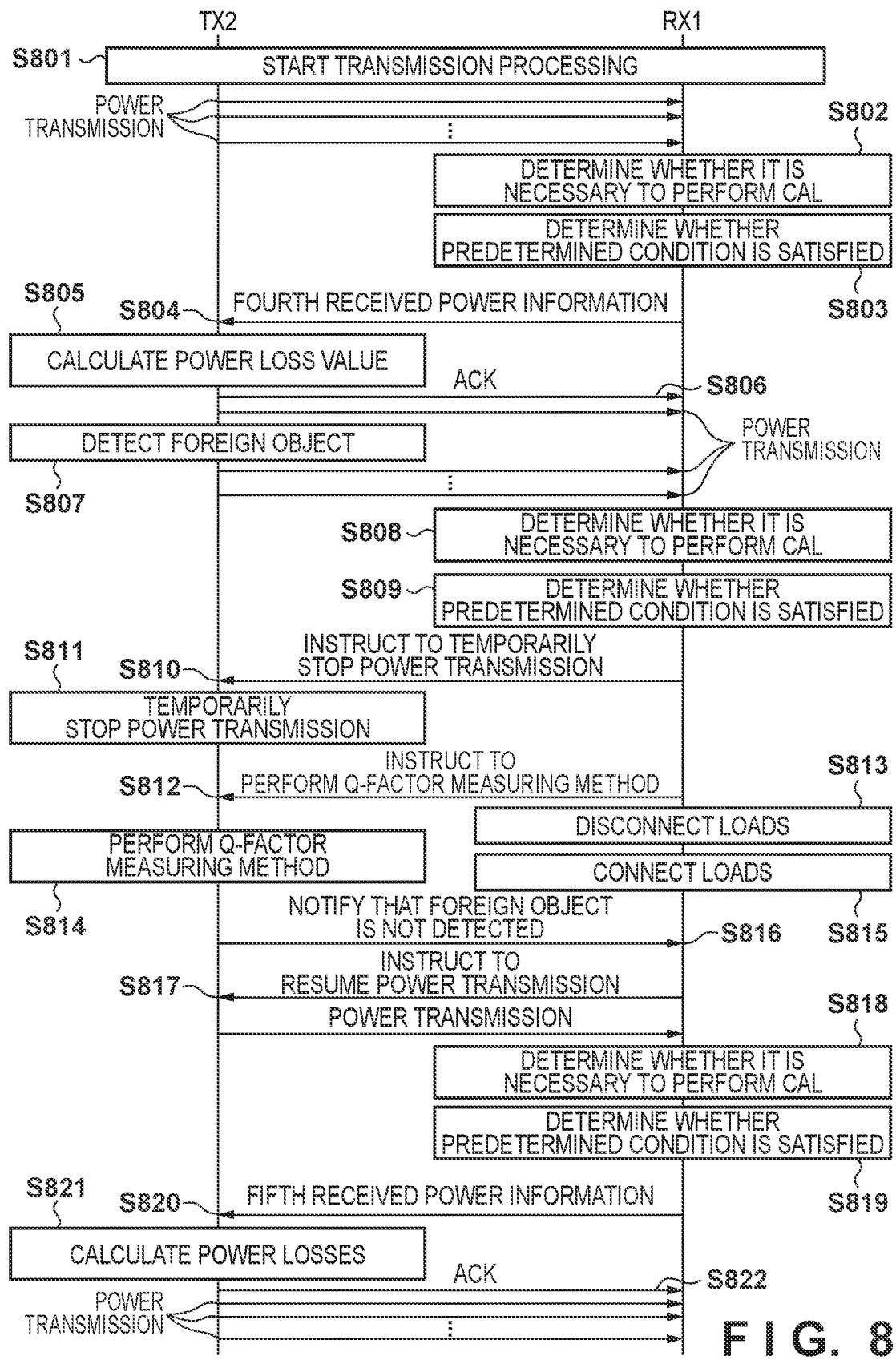
FIG. 8 is a sequence chart showing processing, in the Power Transfer phase, of a power transferring system according to the second embodiment.
Figure 9:
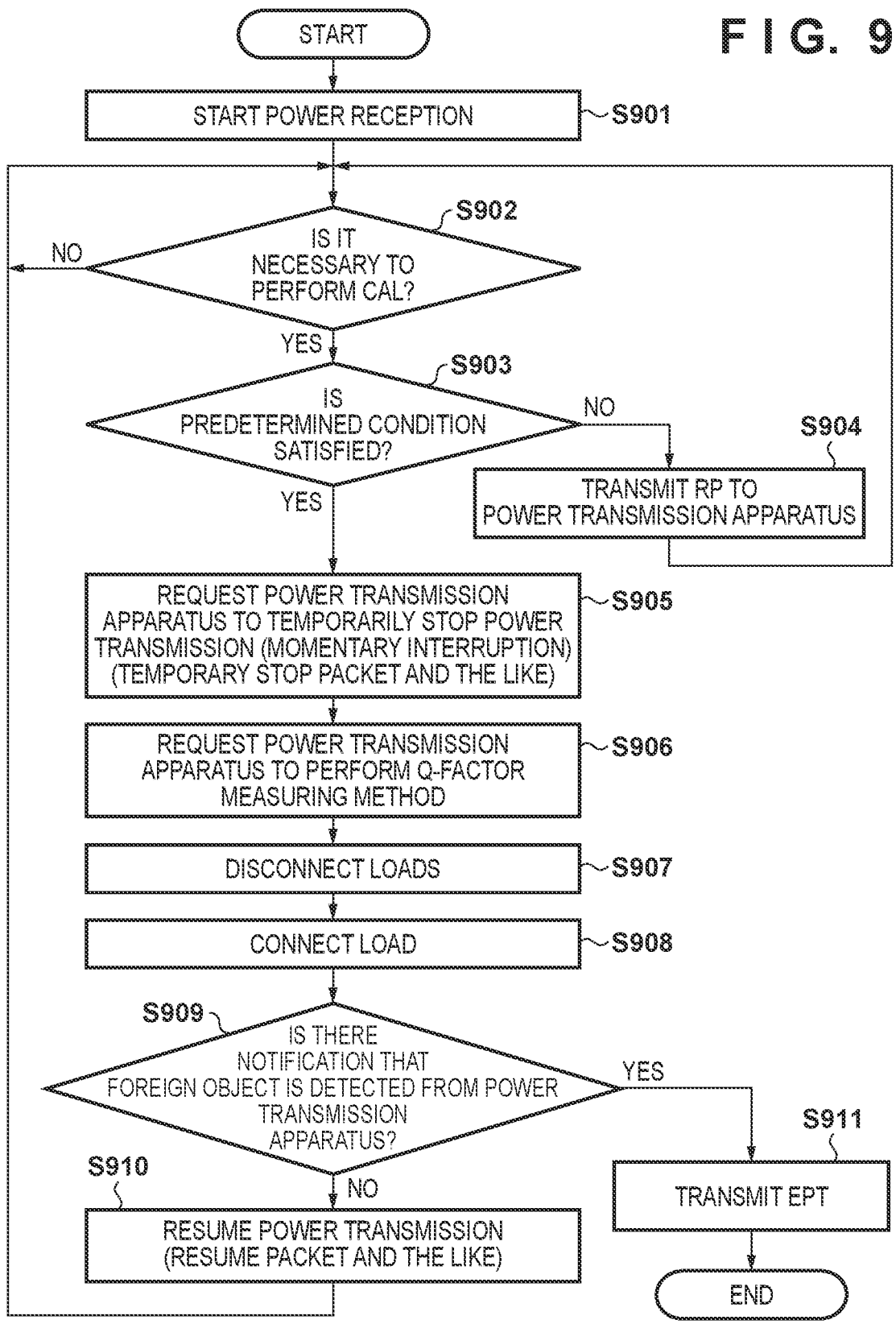
FIG. 9 is a flowchart showing processing, in the Power Transfer phase, of a power receiving apparatus according to the second embodiment.
Figure 10:
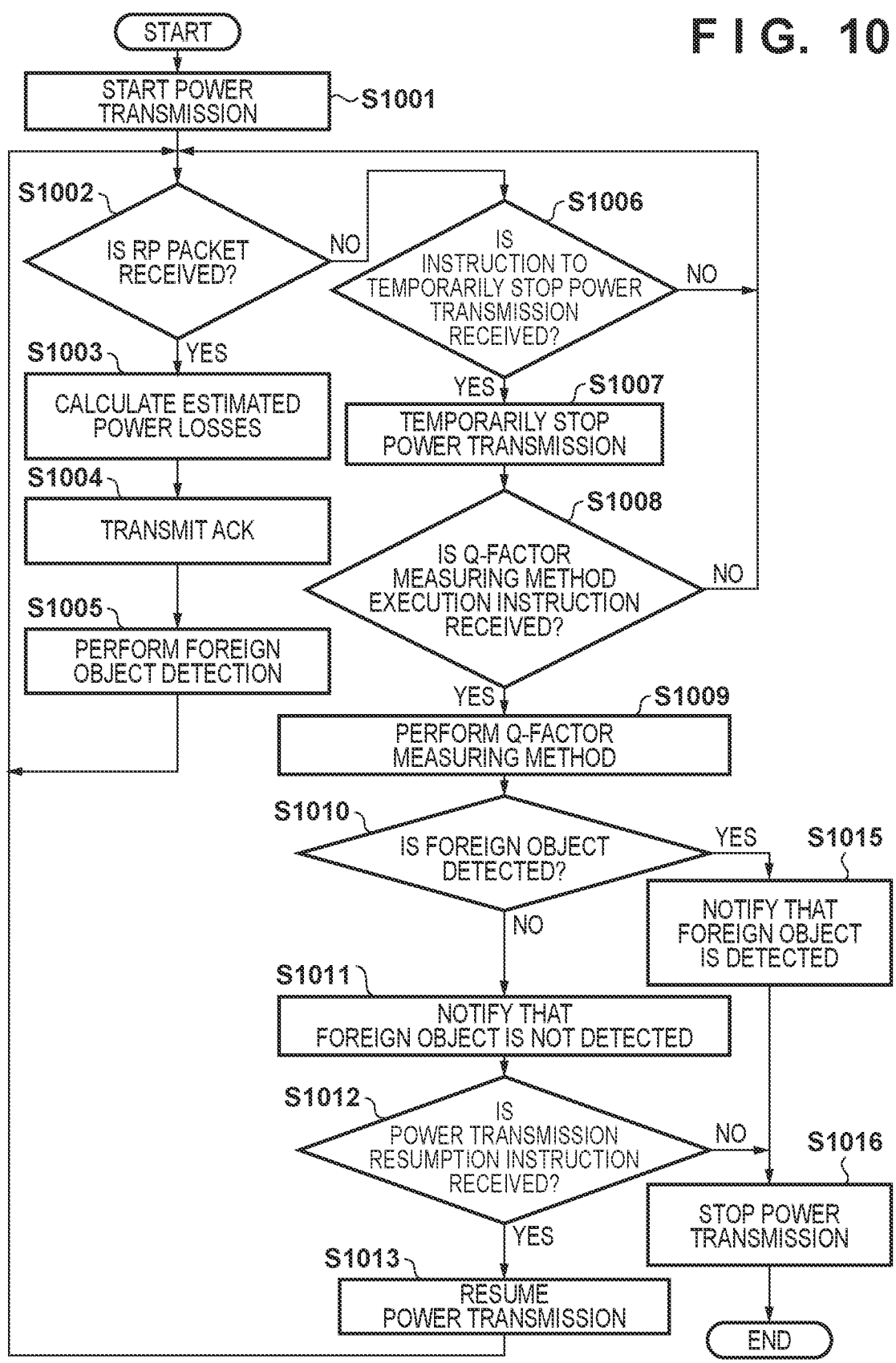
FIG. 10 is a flowchart showing processing, in the Power Transfer phase, of a power transmitting apparatus according to the second embodiment.

Operations of the TX 2 and the RX 1 for implementing this will be described with reference to a sequence shown FIG. 8, a flowchart of the power receiving apparatus shown in FIG. 9, and a flowchart of the power transmitting apparatus shown in FIG. 10.

First, the TX 2 starts transmitting power to the RX 1, and the RX 1 starts receiving power (S801 and steps S901 and S1001). After the start of power reception, the RX 1 determines whether it is necessary to perform CAL processing (S802 and step S902). For example, if transmission power is changed to higher power, new calibration points (for example, 1100, 1103, and 1101 in FIG. 11) need to be created. Hence, it is determined that CAL processing needs to be executed. Alternatively, in some cases, the temperature of the TX 2 or the RX 1 rises due to power transmission, the characteristics of circuits or components in the TX 2 or the RX 1 vary, and a line or curve connecting the calibration points (for example, a line connecting the points 1100, 1103, and 1101 in FIG. 11) varies. In this case, since the calibration points need to be updated, it is determined that CAL processing needs to be performed.

Next, it is determined whether a predetermined condition to execute second foreign object detection is satisfied (S803 and step S903). This determines whether the possibility of presence of a foreign object between the TX 2 and the RX 1 is high. For example, if a predetermined time has elapsed from previous foreign object detection executed by a foreign object detection unit 303 shown in FIG. 3A, it is determined that the possibility of a foreign object between the TX 2 and the RX 1 is high. If the predetermined time has not elapsed, it is determined that the possibility of a foreign object is low. Upon determining that the possibility of a foreign object is low (NO in step S903), the RX 1 transmits data (fourth received power information) corresponding to power received by the RX 1 to the TX 2 by a received power packet (RP packet) (S804 and step S904). Upon receiving the RP packet (step S1002), the TX 2 executes CAL processing (S805 and step S1003), and if there is no problem as the result of CAL processing, transmits an ACK to the RX 1 (S806 and step S1004). Based on the result of CAL processing, the TX 2 performs foreign object detection by first foreign object detection at a predetermined timing during power transmission (S807 and step S1005). After the elapse of a predetermined time, the RX 1 determines whether it is necessary to perform CAL processing again (S808 and step S902), and determines whether a predetermined condition is satisfied (step S903 and S809). This determines whether the possibility of presence of a foreign object between the TX 2 and the RX 1 is high. In this case, if the elapsed time exceeds a predetermined time, it is determined that the possibility of a foreign object is high. Before CAL processing is performed, the TX 2 confirms, using a foreign object detection method different from the Power Loss method, that no foreign object is between the TX 2 and the RX 1. To do this, the RX 1 instructs the TX 2 to temporarily stop power transmission (step S905 and S810). Upon receiving the instruction to temporarily stop power transmission (step S1006), the TX 2 temporarily stops power transmission (step S1007 and S811). The RX 1 requests the TX 2 to execute foreign object detection (second foreign object detection) by the Q-Factor measuring method (step S906 and S812). Then, the RX 1 controls a switch unit 209 to disconnect loads (a battery and the like) (step S907 and S813). This is because if the loads of the RX 1 are in a connected state when performing second foreign object detection, foreign object detection cannot be executed, or the foreign object detection accuracy lowers. Upon receiving the foreign object detection execution instruction by the Q-Factor measuring method (Q-FACTOR MEASUREMENT) (step S1008 and S812), the TX 2 performs foreign object detection by the Q-Factor measuring method (Q-FACTOR MEASUREMENT) (step S1009 and S814). After a predetermined time for the TX 2 to perform foreign object detection by the Q-Factor measuring method (Q-FACTOR MEASUREMENT) has elapsed, the RX 1 connects the loads (step S908 and S815). If the TX 2 does not detect a foreign object as the result of second foreign object detection (NO in step S1010), the TX 2 notifies the RX 1 that no foreign object is detected (step S1011 and S816). Upon receiving, from the TX 2, the notification representing that the TX 2 does not detect a foreign object (NO in step S909), the RX 1 instructs the TX 2 to resume power transmission (step S910 and S817). Upon receiving the power transmission resumption instruction (step S1012), the TX 2 resumes power transmission (step S1013). If it is confirmed, by the second foreign object detection, that no foreign object exists between the TX 2 and the RX 1, the RX 1 returns the process to step S902 to determine whether to perform CAL processing (step S902 and S818), and determine whether a predetermined condition is satisfied (step S903 and S819). Upon determining that the predetermined condition is satisfied, the RX 1 decides to perform CAL processing, and transmits data (fifth received power information) for executing CAL processing to the TX 2 by RP (step S904 and S820). Upon receiving the RP (step S1002 and S820), the TX 2 calculates the power loss and executes CAL processing (step S1003 and S821), and transmits an ACK to the RX 1 (step S1004 and S822). If a foreign object is detected in step S1010, the TX 2 notifies the RX 1 that a foreign object is detected (step S1015), and stops power transmission (step S1016). Upon receiving, from the power transmitting apparatus, the notification representing that a foreign object is detected (YES in step S909), the RX 1 may transmit an EPT packet to the TX 2 (step S911) to stop power transmission. As described above, according to this embodiment, before CAL processing for first foreign object detection is performed, second foreign object detection different from the first foreign object detection can be performed in a shorter time. This can prevent a foreign object from being between the TX 2 and the RX 1 when executing CAL processing and the accuracy of first foreign object detection from lowering.

Third Embodiment

In the second embodiment, a method has been described in which when performing foreign object detection by the Power Loss method, a temporary stop packet for requesting temporary power transmission stop (momentary interruption) is transmitted to the power transmitting apparatus, and the power transmitting apparatus is controlled to perform the Q-Factor measuring method before CAL processing needed for foreign object detection is performed. In the third embodiment, a method will be described in which control is performed to perform second foreign object detection during the Power Transfer phase without adding a new packet (protocol) to the existing WPC standard, and it is checked, in a shorter time, whether a foreign object is on the power transmitting apparatus. This makes it possible to ensure compatibility while reducing verification needed by adding a new packet (protocol). Note that a description of the same components, functions, and processes as in the first or second embodiment will be omitted.

Figure 14:
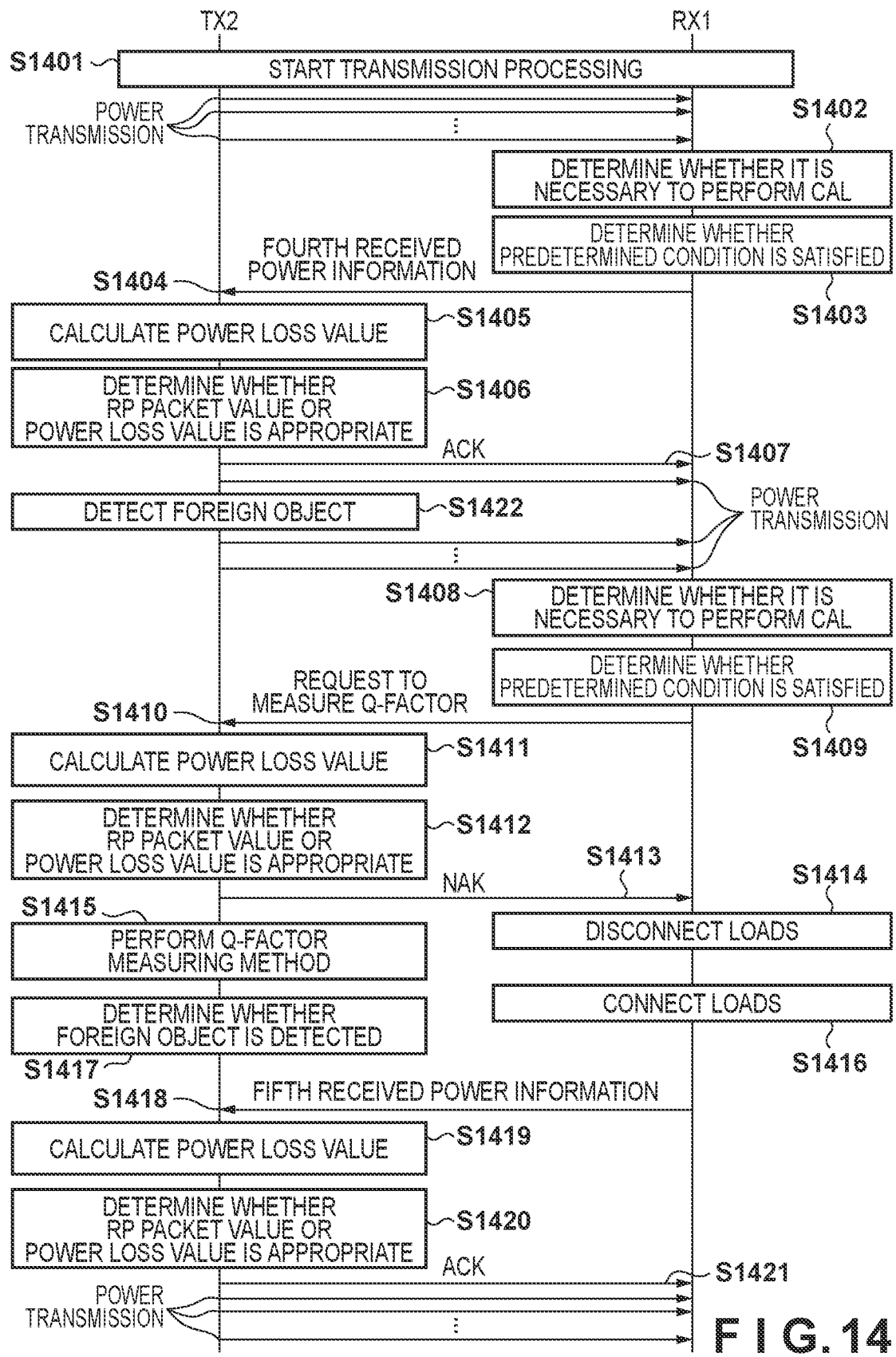
FIG. 14 is a sequence chart showing processing, in the Power Transfer phase, of a power transferring system according to the third embodiment.
Figure 15:
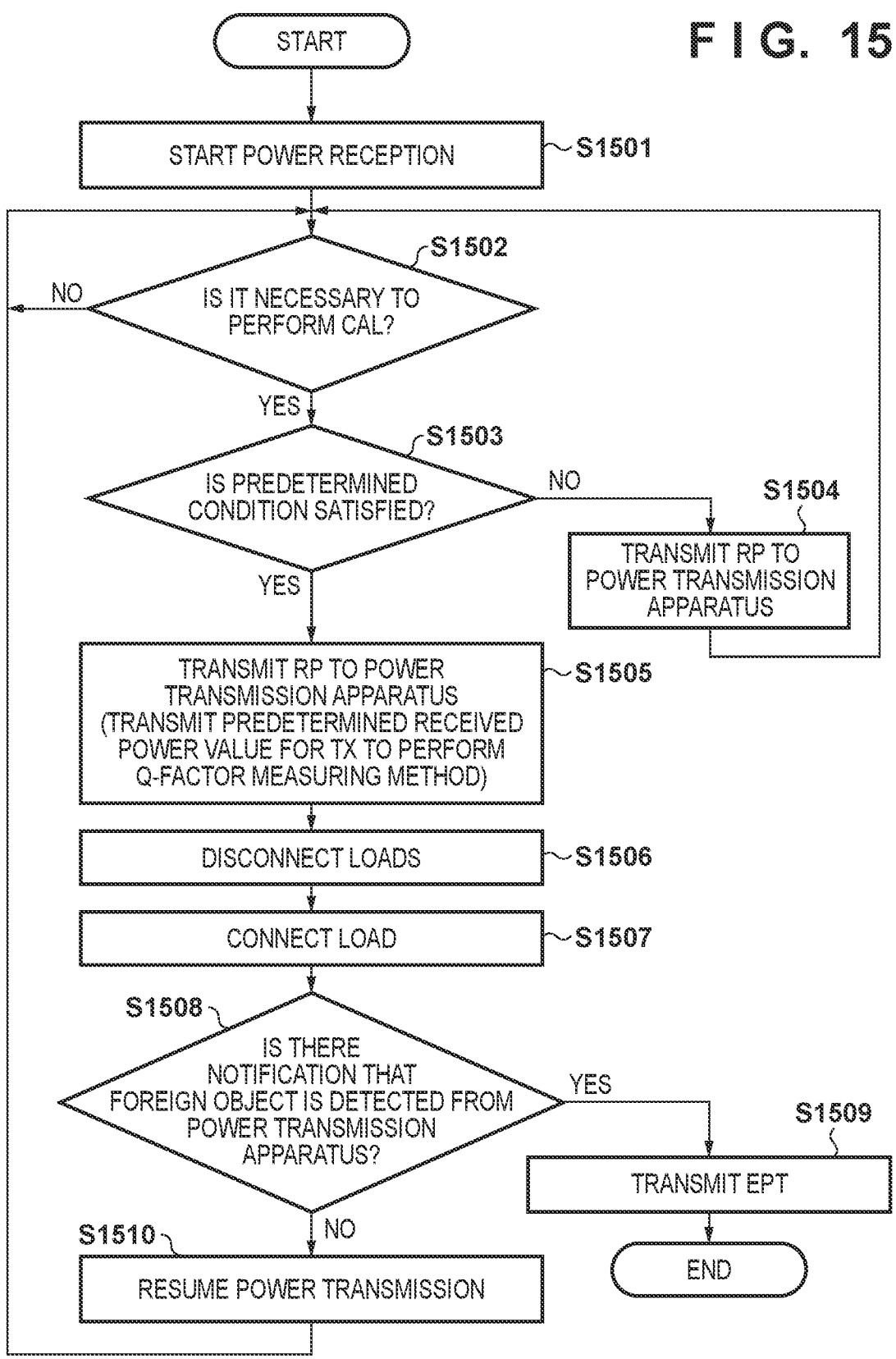
FIG. 15 is a flowchart showing processing, in the Power Transfer phase, of a power receiving apparatus according to the third embodiment.
Figure 16:
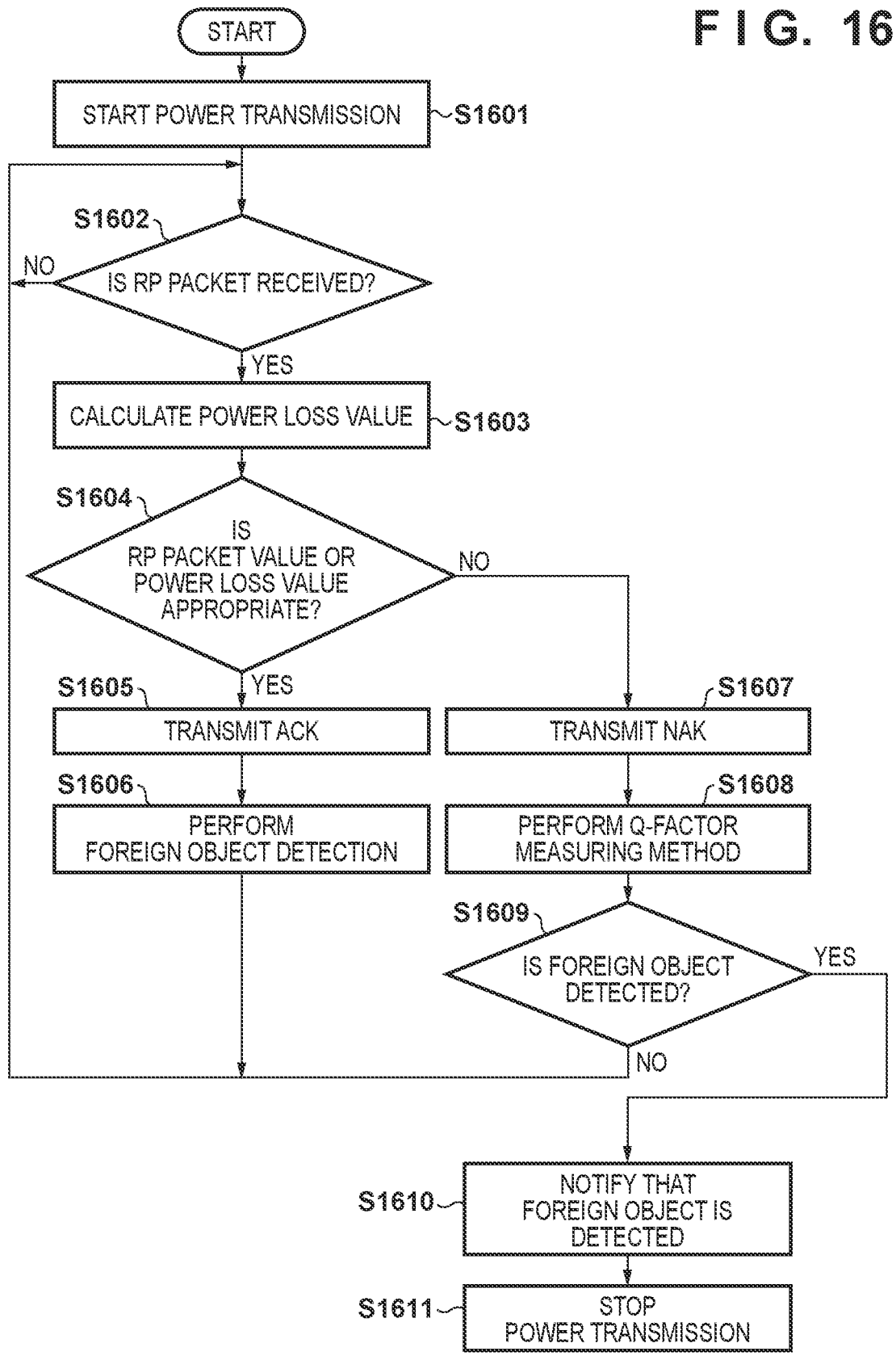
FIG. 16 is a flowchart showing processing, in the Power Transfer phase, of a power transmitting apparatus according to the third embodiment.

Operations of a TX 2 and an RX 1 according to this embodiment will be described with reference to a flowchart of the RX 1 shown in FIG. 15, a flowchart of the TX 2 shown in FIG. 16, and a processing sequence shown FIG. 14.

First, the TX 2 starts transmitting power to the RX 1, and the RX 1 starts receiving power (steps S1501 and S1601 and S1401). After the start of power reception, the RX 1 determines whether it is necessary to perform CAL processing (step S1502 and S1402). For example, if transmission power is changed to higher power, new Calibration points (for example, 1100, 1103, and 1101 in FIG. 11) need to be created. Hence, it is determined that CAL processing needs to be performed. Alternatively, in some cases, the temperature of the TX 2 or the RX 1 rises due to power transmission, the characteristics of circuits or components vary, and a line or curve connecting the calibration points (for example, a line connecting the points 1100, 1103, and 1101 in FIG. 11) varies. In this case, to update the calibration points, the RX 1 determines that it is necessary to execute CAL processing. Next, the RX 1 determines whether a predetermined condition to execute second foreign object detection is satisfied (step S1503 and S1403). This determines whether the possibility of a foreign object between the TX 2 and the RX 1 is high. For example, if a predetermined time has not elapsed from previous foreign object detection (first or second foreign object detection) executed by a foreign object detection unit 303 shown in FIG. 3A, the RX 1 determines that the possibility of a foreign object between the TX 2 and the RX 1 is low. If the predetermined time has elapsed from previous foreign object detection, the RX 1 determines that the possibility of a foreign object between the TX 2 and the RX 1 is high.

Upon determining that the possibility of a foreign object is low, the RX 1 transmits the received power value (fourth received power information) of power received by the RX 1 to the TX 2 by RP (step S1504 and S1404). The TX 2 receives the RP (step S1602) and executes CAL processing (step S1603 and S1405). Then, the TX 2 determines whether the received power value in the received Received Power Packet or the calculated power loss value is appropriate (steps S1604 and S1506). This determination is done based on, for example, whether the received power value in the received RP is larger than a predetermined threshold, or whether the value of the calculated power loss value is larger than a predetermined threshold. If the TX 2 determines, as the result of determination, that the received power value in the received RP has no problem, the TX 2 transmits an ACK to the RX 1 (steps S1605 and S1507). The TX 2 performs first foreign object detection based on the Power Loss method that is the first foreign object detection method at a predetermined timing during power transmission (step S1606 and S1422). After a predetermined time, the RX 1 determines again whether it is necessary to perform CAL processing (step S1502 and S1408). If it is determined that CAL processing needs to be performed, next, it is determined whether a predetermined condition is satisfied (step S1503 and S1409). If it is determined that the possibility of a foreign object is high because of, for example, the elapse of a long time from previous foreign object detection, the RX 1 transmits a signal to cause the TX 2 to execute second foreign object detection. For example, not the received power value of the power received by the RX 1 but a value determined not to be appropriate by the TX 2 is transmitted to the TX 2 as a received power value by the RP packet (step S1505 and S1410). This value may be, for example, the maximum value or minimum value of the received power value that can be set by the RP packet. Alternatively, it may be a predetermined value for causing the TX 2 to perform second foreign object detection. This can also be implemented by holding, in a portion for holding information other than the received power value in the RP, a value corresponding to the request for causing the TX 2 to execute second foreign object detection. In another example, the RP packets may be transmitted to the TX 2 continuously a plurality of times within a predetermined time, thereby causing the TX 2 to execute second foreign object detection.

The TX 2 executes CAL processing (power loss value calculation) based on the information included in the received RP (step S1603 and S1411). The TX 2 determines whether the received power value in the received RP or the calculated value of the power loss value is appropriate (step S1604 and S1412). At this time, if the RX 1 transmits a value determined not to be appropriate by the TX 2 as a received power value by the RP, as described above, the TX 2 determines that the received power value in the RP or the calculated value of the power loss value is not appropriate. That is, when the RX 1 transmits a value that is obviously abnormal to the TX 2 as a received power value by the RP, the TX 2 can recognize that the RX 1 is requesting execution of second foreign object detection. Similarly, if the RX 1 transmits a predetermined value for causing the TX 2 to execute second foreign object detection to the TX 2 as a received power value by the RP, the TX 2 can recognize that the RX 1 is requesting execution of second foreign object detection. Alternatively, if the RX 1 holds, in a portion for holding information other than the received power value in the RP, information for requesting the TX 2 to execute second foreign object detection, the TX 2 can recognize that the RX 1 is requesting execution of second foreign object detection. The TX 2 transmits an NAK to the received RP to the RX 1 (step S1607 and S1413). This allows the RX 1 to recognize that the TX 2 is going to perform second foreign object detection by the Q-Factor measuring method (Q-FACTOR MEASUREMENT).

The RX 1 that recognizes that the TX 2 is going to perform second foreign object detection controls a switch unit 209 to disconnect loads (a battery and the like) (step S1506 and S1414). This is because if the loads of the RX 1 are in a connected state when performing foreign object detection by the Q-Factor measuring method (Q-FACTOR MEASUREMENT), foreign object detection by the Q-Factor measuring method cannot be executed, or the foreign object detection accuracy lowers. Hence, when the TX 2 performs foreign object detection other than the Q-Factor measuring method, in which the loads need not be disconnected, the process of S1414 is unnecessary.

Then, the TX 2 executes foreign object detection by the Q-Factor measuring method (Q-FACTOR MEASUREMENT) that is the second foreign object detection method (step S1608 and S1415). After waiting for a predetermined time for the TX 2 to execute foreign object detection by the Q-Factor measuring method (Q-FACTOR MEASUREMENT), the RX 1 controls the switch unit 209 to connect the loads (the battery and the like) again (step S1507 and S1416). The TX 2 determines whether a foreign object is detected as the result of performing foreign object detection by the Q-Factor measuring method (step S1609 and S1417). If no foreign object is detected, the TX 2 starts power transmission. At this time, the TX 2 may notify the RX 1 that no foreign object is detected. The RX 1 determines the presence/absence of a notification from the TX 2 representing that a foreign object is detected (step S1507), and if there is no notification for a predetermined time, determines that no foreign object is detected, and returns to step S1502. Alternatively, if a notification representing that no foreign object is detected is received from the TX 2, the RX 1 may determine that no foreign object is detected, and return to step S1502. Here, if the TX 2 detects a foreign object in step S1609, the TX 2 notifies the RX 1 that a foreign object is detected (step S1610). Upon receiving, from the TX 2, the notification representing that a foreign object is detected, the RX 1 may transmit an EPT to the TX 2 (step S1509) to stop power transmission.

Upon determining, in step S1502, that CAL processing needs to be performed and that no foreign object exists as the result of execution of second foreign object detection by the TX 2, the RX 1 determines, in step S1503, that a predetermined condition is satisfied (the possibility of a foreign object is low). The RX 1 transmits an RP (fifth received power information) to the TX 2 again (step S1504 and S1418). The RP at this time stores the received power value of the power received by the RX 1. The TX 2 receives RP packet (step S1602 and S1418), performs CAL processing based on the received RP (step S1603 and S1419), and determines whether the received power value in the received RP or the calculated value of the power loss value is appropriate (step S1604 and S1420). If the value is determined as appropriate, and the CAL processing is completed, the TX 2 transmits an ACK to the RX 1 (step S1605 and S1421). The TX 2 transmits power to the RX 1 and executes first foreign object detection based on the result of the above-described CAL processing at a predetermined timing (step S1606).

Note that in the above-described embodiment, in step S1604, the TX 2 decides whether to execute first foreign object detection or second foreign object detection based on the information of the RP from the RX 1. However, the TX 2 may decide which foreign object detection should be performed. That is, the TX 2 may perform determination by the same method as in steps S1502 and S1503, upon determining to execute first foreign object detection, transmit an ACK (step S1605), or upon determining to execute second foreign object detection, transmit an NAK (step S1607).

Thus, it is possible to execute second foreign object detection before execution of CAL processing and check, in a shorter time, whether a foreign object is on the power transmitting apparatus without adding a new packet (protocol) type to the existing WPC standard.

Fourth Embodiment

In the second and third embodiments, a method has been described in which before CAL processing used in first foreign object detection is executed, second foreign object detection different from first foreign object detection is performed to confirm the presence/absence of a foreign object between the TX 2 and the RX 1. In an example, the execution order of CAL processing and second foreign object detection may be reversed to execute CAL processing for first foreign object detection and then confirm the presence/absence of a foreign object between the TX 2 and the RX 1 by second foreign object detection different from first foreign object detection. This is because in a case where second foreign object detection is executed after CAL processing, and it is determined that a foreign object exists between the TX 2 and the RX 1, CAL processing is re-executed, thereby preventing first foreign object detection from being executed using the result of CAL processing in a state in which a foreign object exists.

Figure 17:
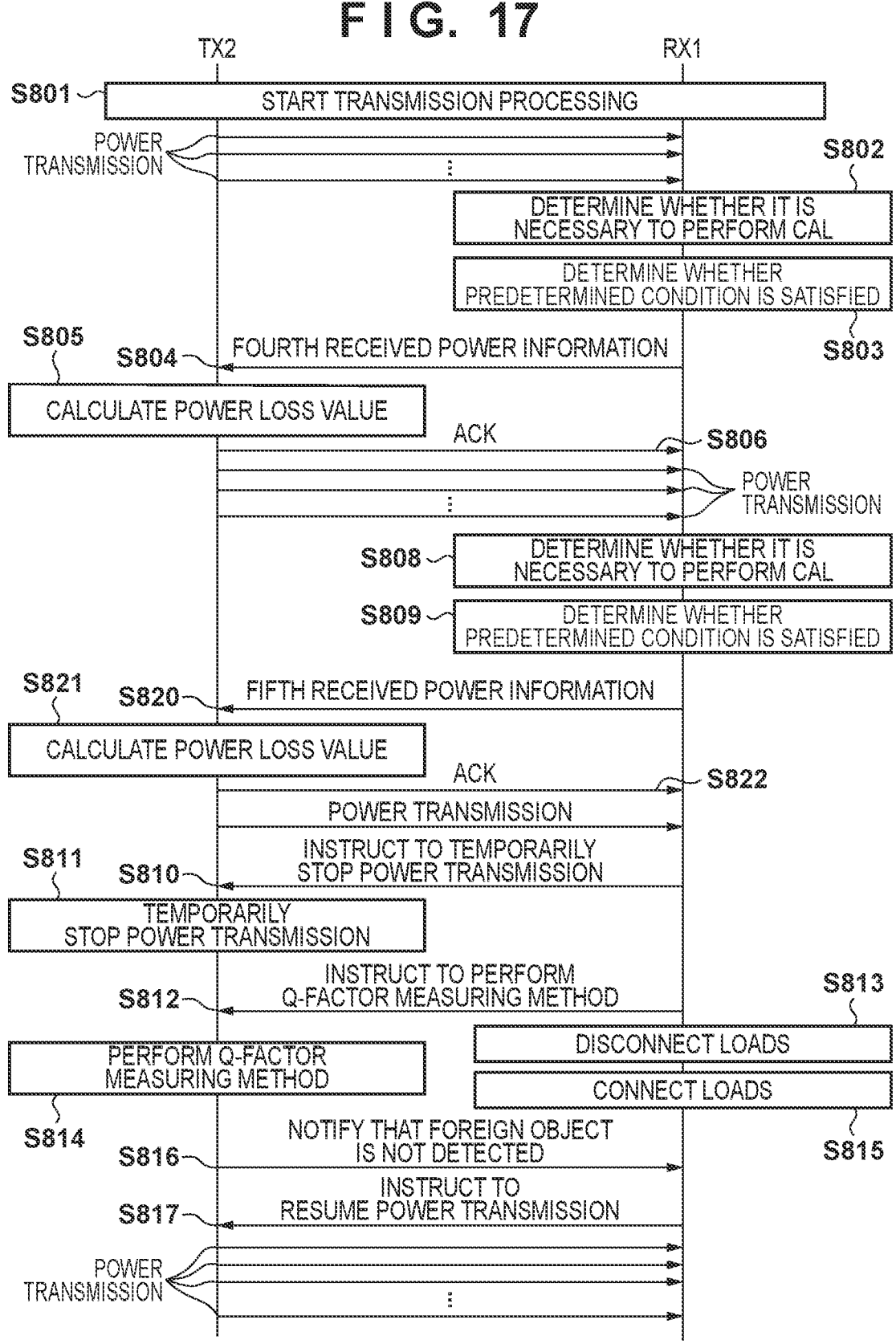
FIG. 17 is a sequence chart showing processing, in the Power Transfer phase, of a power transferring system according to the fourth embodiment.
Figure 18:
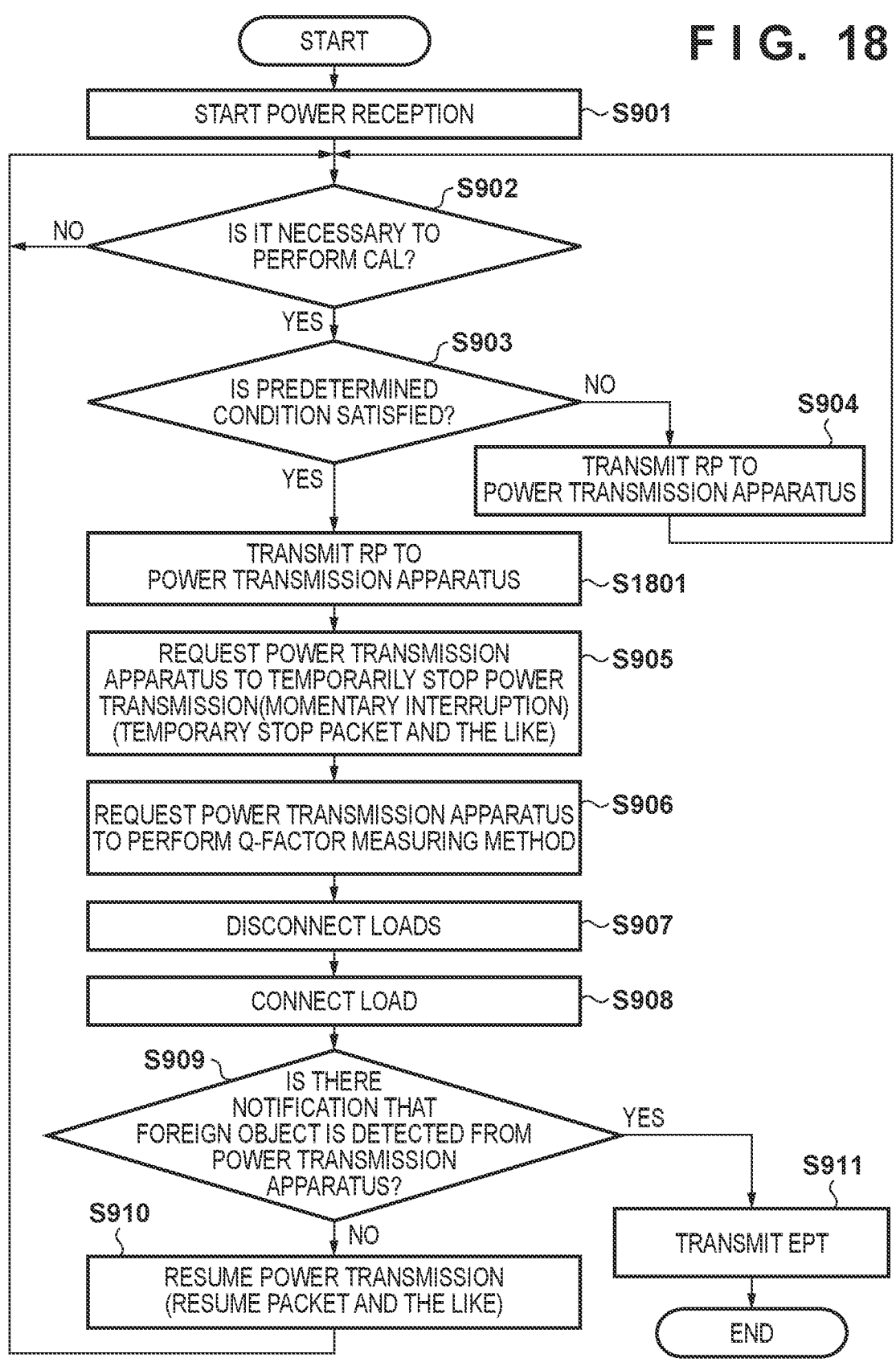
FIG. 18 is a flowchart showing processing, in the Power Transfer phase, of a power receiving apparatus according to the fourth embodiment.

Operations of a TX 2 and an RX 1 according to this embodiment in a case where the execution order of CAL processing and second foreign object detection in the second embodiment is reversed are shown in a processing sequence chart of the RX 1 and the TX 2 in FIG. 17 and a flowchart of the RX 1 in FIG. 18. Note that the processing of the TX 2 is the same as the flowchart of the TX 2 according to the second embodiment shown in FIG. 8. Also, the same step numbers as in FIGS. 8 and 9 denote the same processes in the processing sequence chart of FIG. 17 and the flowchart of FIG. 18, and a description thereof will be omitted.

Upon determining that a predetermined condition to execute second foreign object detection is satisfied (YES in step S903), the RX 1 transmits a Received Power Packet (RP) including received power information for CAL processing to the TX 2 (step S1801 and S820). The TX 2 that has received the RP calculates a power loss value based on the received power information (fifth received power information) included in the RP and executes CAL processing (S821). Also, the RX 1 performs processing of requesting the TX 2 to do second foreign object detection (step S906 and S812), and if the TX 2 detects a foreign object by second foreign object detection (YES in step S909), transmits an EPT (step S911) to cause the TX 2 to execute CAL processing again. This can prevent first foreign object detection from being performed based on reference power by CAL processing in a state in which a foreign object exists between the TX 2 and the RX 1.

Note that in this embodiment, when the TX 2 receives the RP in step S1801, CAL processing is executed immediately. In an example, execution of CAL processing may wait for a predetermined time. For example, if the TX 2 does not receive a temporary power transmission stop or second foreign object detection execution request from the RX 1 within a predetermined time from reception of the RP, the TX 2 may execute CAL processing using the received RP. If the TX 2 receives a temporary power transmission stop or second foreign object detection execution request from the RX 1, the TX 2 may execute CAL processing after second foreign object detection. Note that in this case, the TX 2 calculates the power loss value and transmits an ACK before second foreign object detection. However, calibration points may be created after second foreign object detection. That is, calibration point creation may be performed after the process of step S1010 in a case in which a foreign object is not detected by second foreign object detection (NO in step S1010).

Also, in an example, upon receiving a notification representing that a foreign object is detected from the TX 2 in step S909, in step S911, the RX 1 may delete the calibration points created in step S1801.

Alternatively, the TX 2 that has transmitted, in S816 of FIG. 17, a notification representing that a foreign object is detected to the RX 1 may control such that first foreign object detection is not performed using a region corresponding to the calibration points created in S821. For example, in an example shown in FIG. 11, after a calibration point 1101 is created in S821 of FIG. 17, the TX 2 that has detected a foreign object in S816 need not transmit transmission power larger than Pt3 until CAL processing for Pt2 is re-executed. Alternatively, during transmission of transmission power larger than Pt3, the TX 2 need not perform first foreign object detection.

Thus, since first foreign object detection can be prevented from being performed based on CAL processing executed in a state in which the possibility of presence of a foreign object between the TX 2 and the RX 1 is high, it is possible to prevent lowering of the detection accuracy of first foreign object detection.

Fifth Embodiment

In the fourth embodiment, processing of reversing the execution order of CAL processing and second foreign object detection in the second embodiment, executing CAL processing for first foreign object detection, and after that, performing second foreign object detection different from first foreign object detection to confirm the presence/absence of a foreign object between the TX 2 and the RX 1 has been described. In this embodiment, processing of a TX 2 and an RX 1 in a case where the execution order of CAL processing and second foreign object detection in the third embodiment is reversed will be described.

Figure 19:
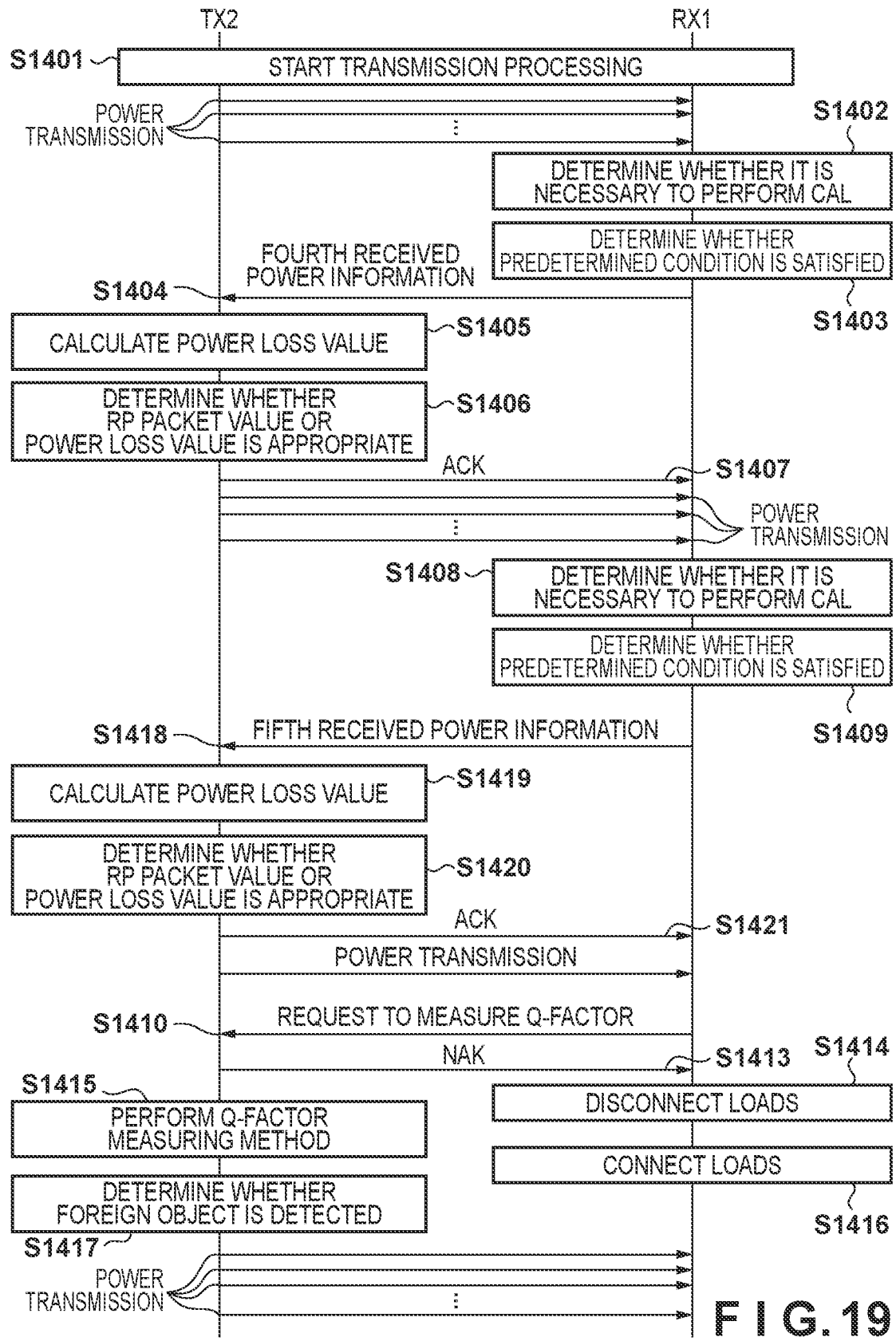
FIG. 19 is a sequence chart showing processing, in the Power Transfer phase, of a power transferring system according to the fifth embodiment.

Operations of the TX 2 and the RX 1 according to this embodiment in a case where the execution order of CAL processing and second foreign object detection in the third embodiment is reversed are shown in a processing sequence chart of the RX 1 and the TX 2 in FIG. 19 and a flowchart of the RX 1 in FIG. 20. Note that the processing of the TX 2 is the same as the flowchart of the TX 2 according to the third embodiment shown in FIG. 16. Also, the same step numbers as in FIGS. 14 and 15 of the third embodiment denote the same processes in FIGS. 19 and 20, and a description thereof will be omitted.

Upon determining that a predetermined condition to execute second foreign object detection is satisfied (YES in step S1503), the RX 1 transmits a Received Power Packet (RP) including received power information for CAL processing to the TX 2 (step S2001 and S1418). The TX 2 that has received the RP calculates a power loss value based on the received power information (fifth received power information) included in the RP and executes CAL processing (S1419). Also, the RX 1 transmits an RP or a predetermined signal for requesting the TX 2 to do second foreign object detection (step S1505 and S1410), and if the TX 2 detects a foreign object by second foreign object detection (YES in step S1508), transmits an EPT (step S1509) to cause the TX 2 to execute CAL processing again. This can prevent first foreign object detection from being performed based on reference power by CAL processing in a state in which a foreign object exists between the TX 2 and the RX 1.

Note that in this embodiment, when the TX 2 receives the RP in S1411, CAL processing is executed immediately. In an example, execution of CAL processing may wait for a predetermined time. This is the same as in the fourth embodiment, and a description thereof will be omitted.

In this embodiment as well, if the TX 2 is configured to perform second foreign object detection upon continuously receiving received power packets in a predetermined time, as in the third embodiment, an instruction for executing second foreign object detection need not be included in the received power packet.

Sixth Embodiment

In the second embodiment, processing of, before execution of CAL processing used in first foreign object detection is instructed, performing second foreign object detection different from first foreign object detection to confirm the presence/absence of a foreign object between the TX 2 and the RX 1 has been described.

In the fourth embodiment, processing of, after execution of CAL processing used in first foreign object detection is instructed, performing second foreign object detection different from first foreign object detection to confirm the presence/absence of a foreign object between the TX 2 and the RX 1 has been described.

In this embodiment, the second embodiment and the fourth embodiment are combined, and processing of, before and after execution of CAL processing used in first foreign object detection is instructed, performing second foreign object detection different from first foreign object detection to confirm the presence/absence of a foreign object between a TX 2 and an RX 1 will be described.

Note that as for the same processes, components, and functions as in the first to fifth embodiments, the same reference numerals are used, and a description thereof will be omitted.

Figure 21A:
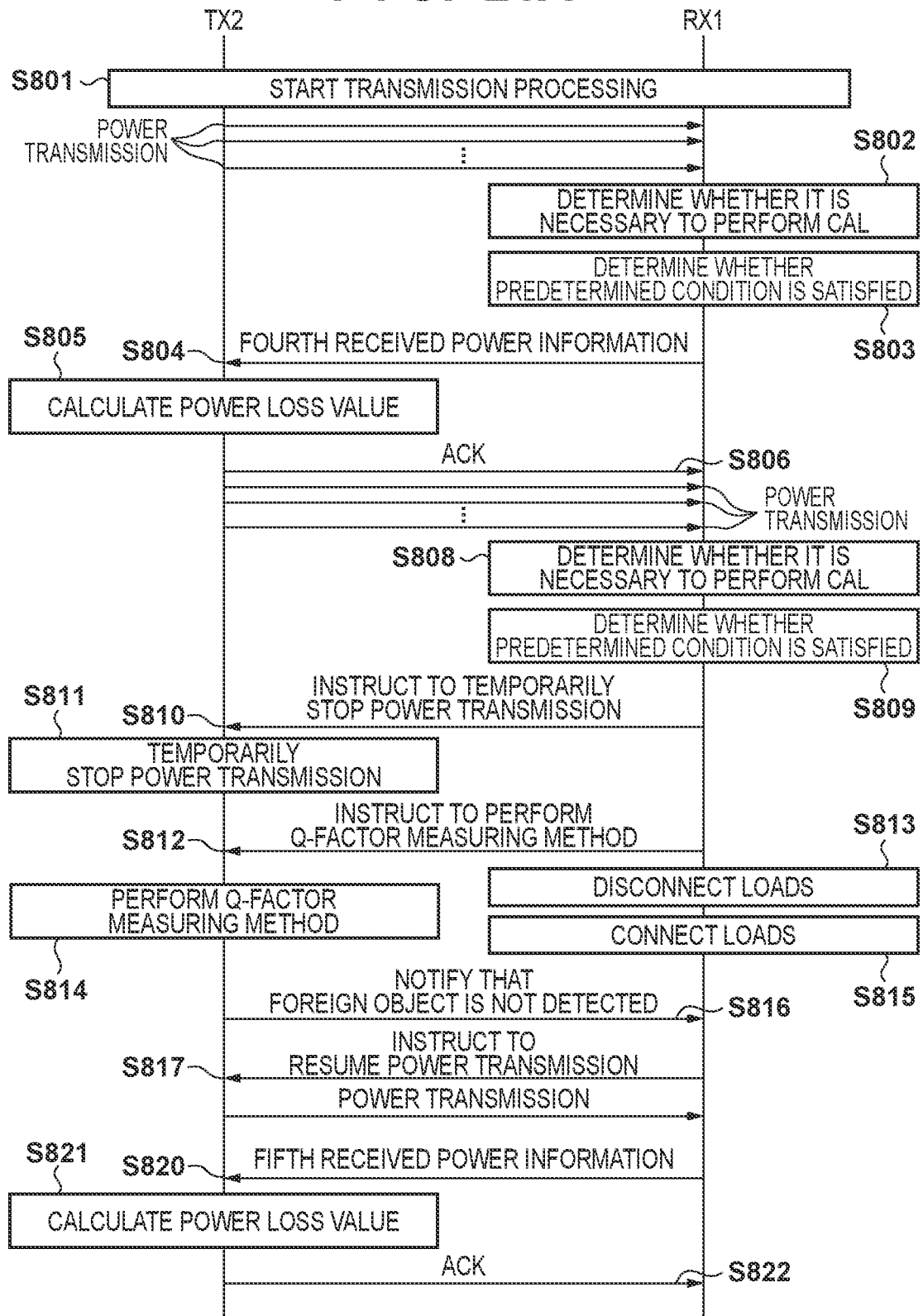
FIG. 21A is a sequence chart showing processing, in the Power Transfer phase, of a power transferring system according to the sixth embodiment.
Figure 21B:
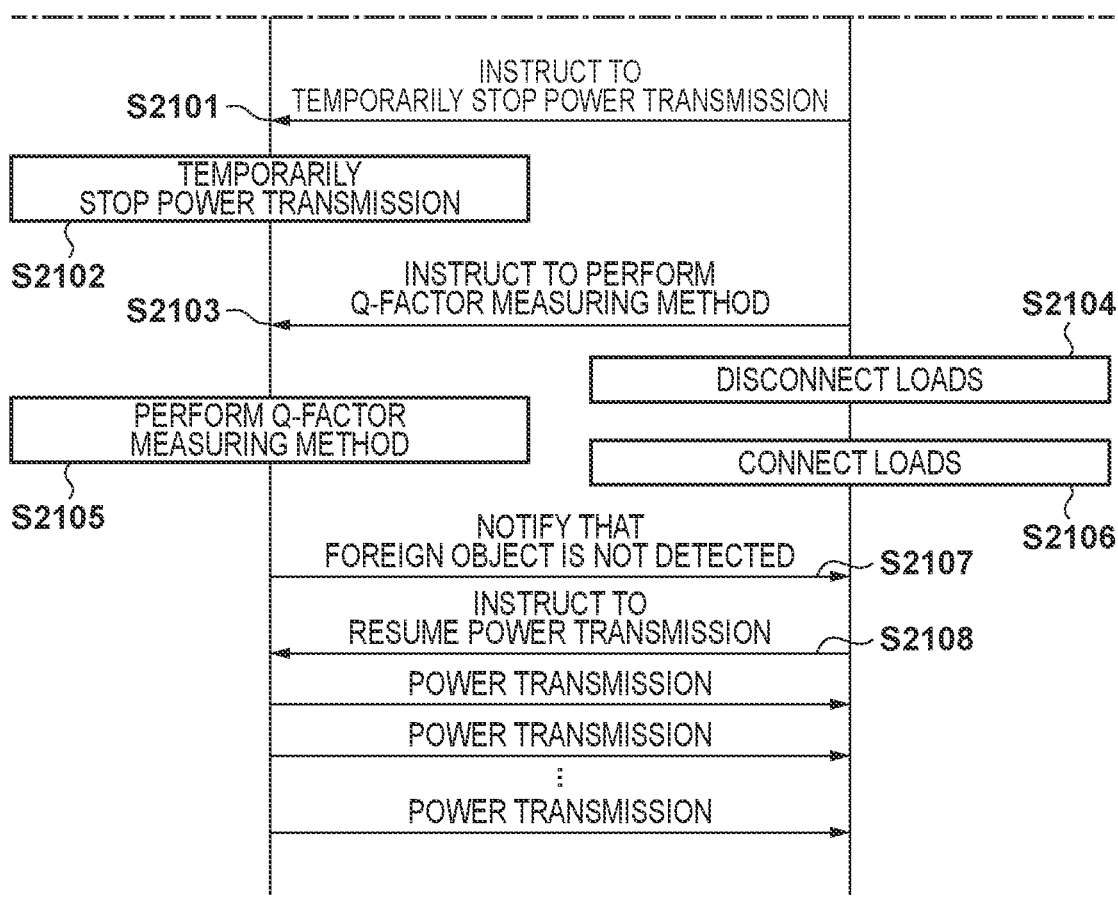
FIG. 21B is a sequence chart showing processing, in the Power Transfer phase, of the power transferring system according to the sixth embodiment.

The processes of S2101 to S2108 in FIG. 21B are the same as the processes of S810 to S817, and a description thereof will be omitted. In addition, the processes of steps S2201 to S2206 in FIG. 22 are the same as the processes of steps S905 to S910, and a description thereof will be omitted.

Figure 22:
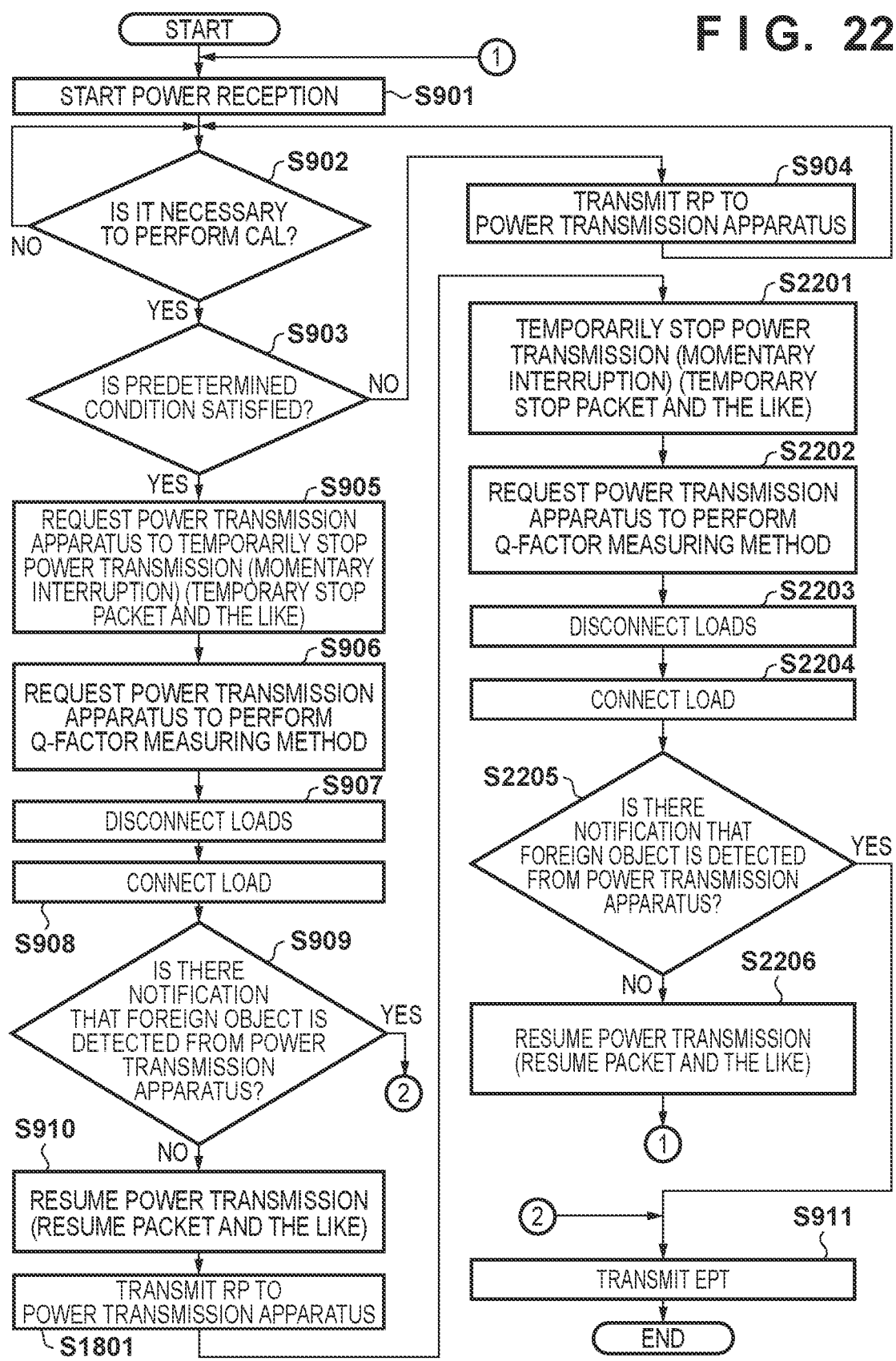
FIG. 22 is a flowchart showing processing, in the Power Transfer phase, of a power receiving apparatus according to the sixth embodiment.

As shown in FIGS. 21A, 21B, and 22, when the TX 2 performs second foreign object detection before and after execution of CAL processing, it is possible to detect presence or removal of a foreign object between the TX 2 and the RX 1 during execution of CAL processing. This makes it possible to judge the validity of the result of CAL processing more accurately.

Seventh Embodiment

In the third embodiment, processing of, before execution of CAL processing used in first foreign object detection is instructed, performing second foreign object detection different from first foreign object detection to confirm the presence/absence of a foreign object between the TX 2 and the RX 1 has been described.

In the fifth embodiment, processing of, after execution of CAL processing used in first foreign object detection is instructed, performing second foreign object detection different from first foreign object detection to confirm the presence/absence of a foreign object between the TX 2 and the RX 1 has been described.

In this embodiment, the third and fifth embodiments are combined, and processing of, before and after execution of CAL processing used in first foreign object detection is instructed, performing second foreign object detection different from first foreign object detection to confirm the presence/absence of a foreign object between a TX 2 and an RX 1 will be described.

Note that as for the same processes, components, and functions as in the first to fifth embodiments, the same reference numerals are used, and a description thereof will be omitted.

Figure 23A:
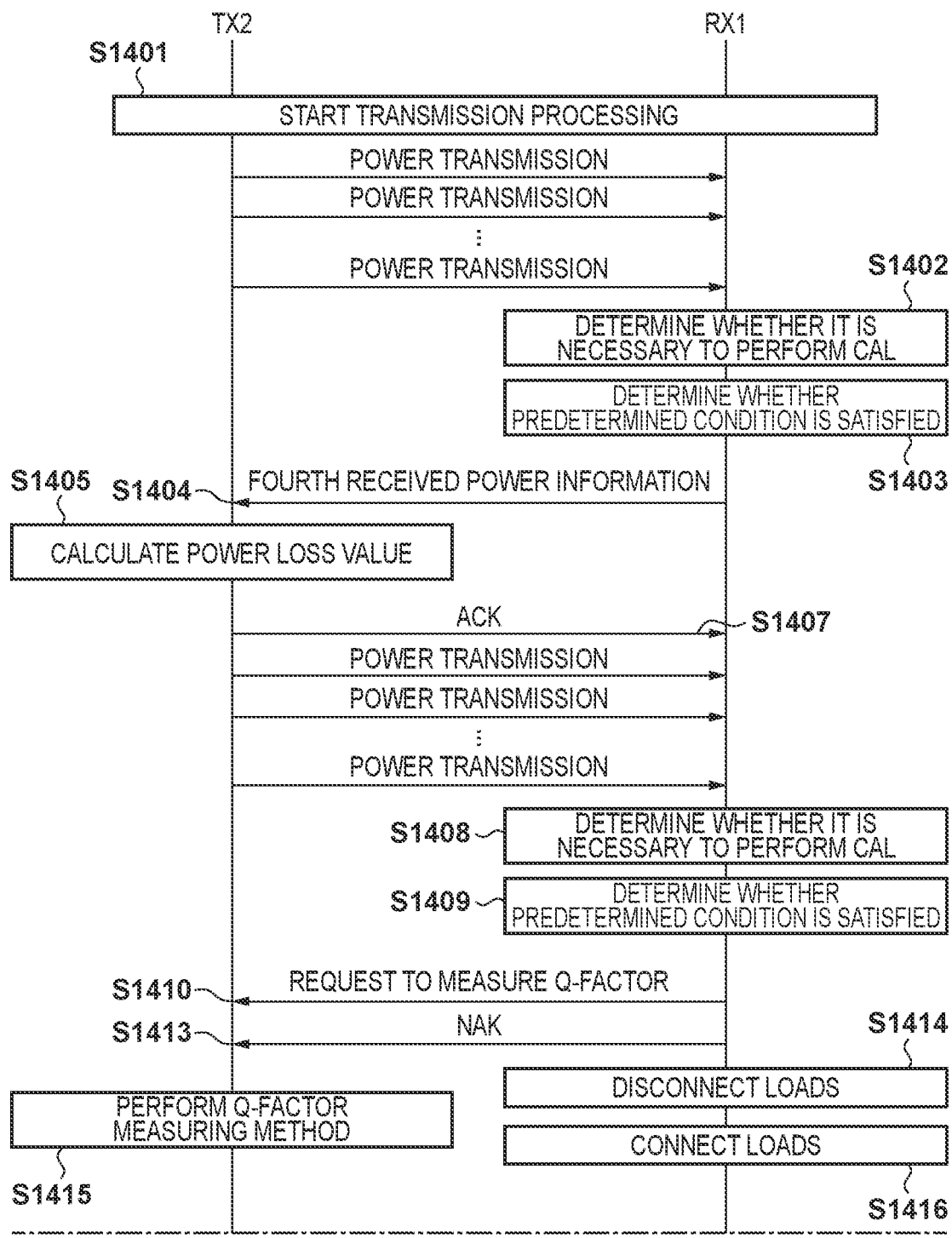
FIG. 23A is a sequence chart showing processing, in the Power Transfer phase, of a power transferring system according to the seventh embodiment.
Figure 23B:
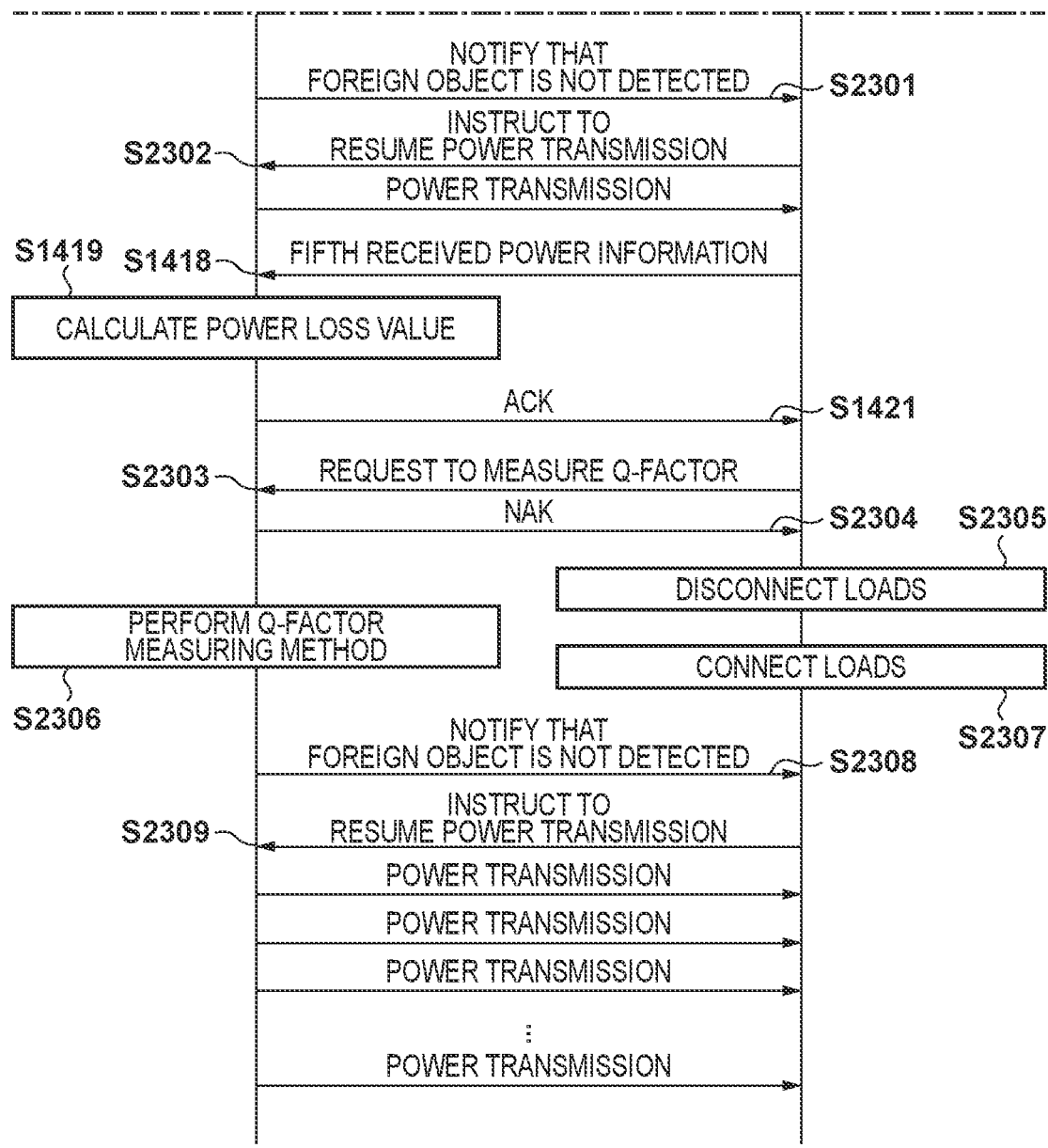
FIG. 23B is a sequence chart showing processing, in the Power Transfer phase, of the power transferring system according to the seventh embodiment.

The processes of S2301 and S2302 in FIG. 23B are the same as the processes of steps S1610 and S1510, and a description thereof will be omitted. In addition, the processes of S2303 to S2309 in FIG. 23B are the same as the processes of S1410 to S1416, S2301, and S2302, and a description thereof will be omitted. Also, the processes of steps S2401 to S2405 in FIG. 24 are the same as the processes of steps S1505 to S1510, and a description thereof will be omitted.

Figure 24:
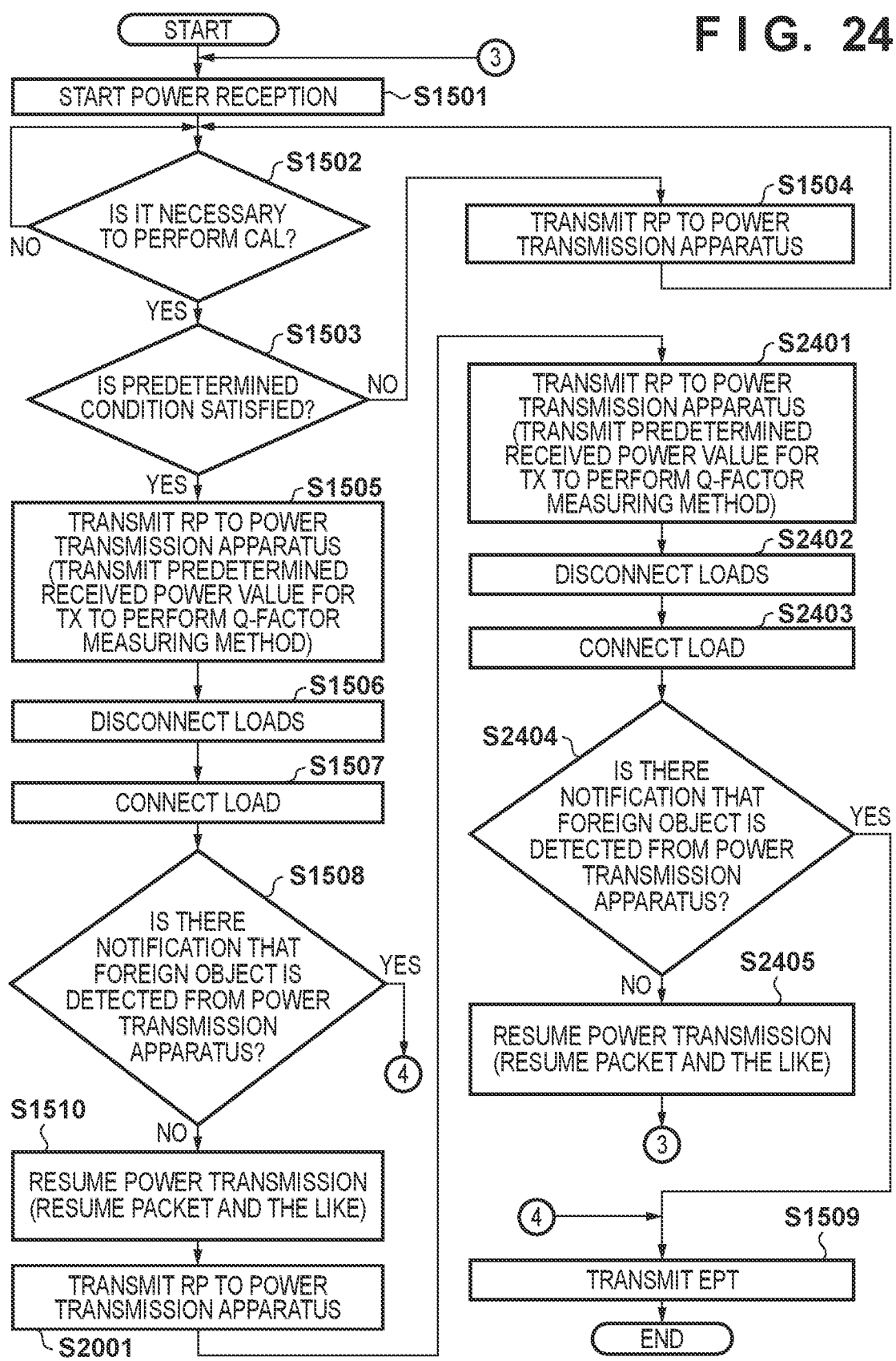
FIG. 24 is a flowchart showing processing, in the Power Transfer phase, of a power receiving apparatus according to the seventh embodiment.

As shown in FIGS. 23A, 23B, and 24, when the TX 2 performs second foreign object detection before and after execution of CAL processing, it is possible to detect presence or removal of a foreign object between the TX 2 and the RX 1 during execution of CAL processing. This makes it possible to judge the validity of the result of CAL processing more accurately.

Other Embodiments

The above-described first to seventh embodiments can optionally be combined. For example, the second embodiment and the third embodiment may be combined, and the power receiving apparatus may instruct to execute second foreign object detection by different methods in accordance with the model of the power transmitting apparatus, the version of the WPC standard supported, and the like.

In the above-described embodiments, as the second foreign object detection different from the first foreign object detection, the Q-Factor measuring method (Q-FACTOR MEASUREMENT) has been described. As a method of measuring the Q-Factor of a power transmitting antenna (power transmitting coil), a signal (for example, a sine wave or a rectangular wave) of a resonance frequency is transmitted for a predetermined time, and the Q-Factor at the resonance frequency is measured. Alternatively, signals of a plurality of frequencies near the resonance frequency are transmitted a plurality of times, and Q-Factors at these frequencies are measured. Alternatively, a signal (for example, a pulse wave) including at least some frequency components of a plurality of frequencies to be measured is transmitted once, and arithmetic processing (for example, Fourier transformation) is performed for the measurement result, thereby measuring Q-Factors at the plurality of frequencies. Alternatively, the above-described signal (electromagnetic wave) may be output, output of the signal may then be stopped, and foreign object detection may be performed based on the attenuation state of the signal waveform (electromagnetic wave waveform) (to be referred to as a waveform attenuation method hereinafter). If the attenuation state of the waveform is large, it can be judged that a foreign object exists. For example, if the waveform amplitude at time T1 is A1 after the stop of output of the electromagnetic wave, and the waveform amplitude at time T2 after the elapse of a predetermined time is A2, second foreign object detection may be performed based on whether the ratio of the waveform amplitudes A1 and A2 as the waveform attenuation state is larger than a predetermined value. Alternatively, second foreign object detection may be performed based on the difference between the waveform amplitudes A1 and A2, the gradient of waveform attenuation (A1−A2)/(T2−T1), the time until the waveform amplitude becomes a predetermined amplitude or less, or the like. Alternatively, letting f be the frequency of the electromagnetic wave waveform, the Q-Factor can be obtained by $$Q=\pi f(T2-T1)/\ln(A1/A2)$$

Hence, foreign object detection may be performed based on this. Alternatively, sharpness (Q-Factor) of resonance may be obtained based on the measurement result at each of the above-described frequencies, and foreign object detection may be performed based on this.

On the other hand, in the second foreign object detection, the absence of a foreign object between the TX 2 and the RX 1 is checked such that the first foreign object detection (foreign object detection by the Power Loss method) is not executed using a Calibration result in a state in which a foreign object exists between the TX 2 and the RX 1. Hence, as the second foreign object detection, a foreign object detection method other than the Q-Factor measuring method (Q-FACTOR MEASUREMENT) may be applied.

For example, other than the Q-Factor of the power transmitting antenna, the resonance frequency of the power transmitting antenna, the sharpness of a resonance curve, an inductor value, the coupling coefficient between the power transmitting antenna and an object placed on the power transmitting apparatus, or the measurement result of the electric characteristic or the like of a power transmitting unit including the power transmitting antenna of the power transmitting apparatus may be used. For these, the presence/absence of a foreign object may be determined based on the measurement result of the electric characteristic at one frequency, or the presence/absence of a foreign object may be determined based on the measurement results of the electric characteristic at a plurality of frequencies.

Note that as a method of measuring the electric characteristic at a plurality of frequencies, a signal (for example, a sine wave or a rectangular wave) of each frequency at which the electric characteristic should be measured is transmitted a plurality of times, and the electric characteristic for the signal of each frequency is measured. This method can obtain an effect of performing measurement while making arithmetic processing in the power transmitting apparatus relatively little.

Alternatively, a signal (for example, a pulse wave) including all frequency components of a plurality of frequencies at which the electric characteristic should be measured is transmitted once, and arithmetic processing (for example, Fourier transformation) is performed for the measurement result, thereby calculating the electric characteristics at the plurality of frequencies.

Alternatively, a signal including some frequency components of a plurality of frequencies at which the electric characteristic should be measured is transmitted a plurality of times, and arithmetic processing (for example, Fourier transformation) is performed for the measurement results, thereby measuring the electric characteristics at the plurality of frequencies. Since this method can decrease the number of times of transmitting the signal for measurement, the measurement can be performed in a relatively short time.

Alternatively, as the second foreign object detection method, a measurement result obtained by a sensor such as a photoelectric sensor, an eddy current type displacement sensor, a contact type displacement sensor, an ultrasonic sensor, an image distinction sensor, or a weight sensor mounted on the power transmitting apparatus may be used.

Also, in the first to seventh embodiments, a method has been described in which before calibration processing for the first foreign object detection is executed during the Power Transfer phase, the presence/absence of a foreign object between the TX 2 and the RX 1 is confirmed by the second foreign object detection different from the first foreign object detection. However, the same effect as described above can be obtained even when confirmation of the presence/absence of a foreign object between the TX 2 and the RX 1 by the second foreign object detection different from the first foreign object detection, which has been described in the first to seventh embodiment, is performed before calibration processing is executed during the Calibration phase. That is, when the first to seventh embodiments are applied to calibration processing during the Calibration phase, the possibility of a foreign object between the TX 2 and the RX 1 can be made low in CAL processing. Also, in the first to seventh embodiments, the Power Loss method is used as the first foreign object detection. Calibration processing (CAL processing) is estimating the power loss between the power transmitting apparatus and the power receiving apparatus in different loads in a case where no foreign object exists between the power transmitting apparatus and the power receiving apparatus. However, in a broader sense, the Calibration processing is a process for obtaining parameters between the power transmitting apparatus and the power receiving apparatus, which are needed for foreign object detection, in a state in which no foreign object exists between the power transmitting apparatus and the power receiving apparatus. Hence, foreign object detection other than the Power Loss method may be applied as the first foreign object detection. For example, foreign object detection by the above-described Q-Factor measuring method (Q-FACTOR MEASUREMENT) or waveform attenuation method may be used as the first foreign object detection. In the Calibration processing, a Q-Factor or waveform attenuation state in the absence of a foreign object may be measured. Even when the threshold for the first foreign object detection is decided based on the result, and foreign object detection is performed, the same effect can be obtained.

According to the present disclosure, it is possible to suppress lowering of the detection accuracy of foreign object detection.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

The invention claimed is:

1. A power receiving apparatus comprising:
power receiving unit configured to wirelessly receive power transmitted from a power transmitting apparatus; and
communication unit configured to communicate with the power transmitting apparatus;
wherein the communication unit transmits a request for predetermined processing to the power transmitting apparatus,
the communication unit receives, after transmitting the request, from the power transmitting apparatus, information corresponding to the request and corresponding to a result of a measurement performed by the power transmitting apparatus in a state where a load in the power receiving apparatus is not connected, and
the communication unit transmits, after the load is connected, a packet requesting for reducing voltage to the power transmitting apparatus according to the information.

2. The power receiving apparatus according to claim 1, wherein the packet is a packet for requesting for stopping power transmission.

3. The power receiving apparatus according to claim 1, wherein the communication unit transmits the packet in a case where the information indicates that a foreign object is detected.

4. The power receiving apparatus according to claim 1, wherein the predetermined processing is processing for Quality Factor measuring.

5. A method executed by a power receiving apparatus comprising:
- transmitting, to a power transmitting apparatus, a request for predetermined processing;
- receiving, after transmitting the request, from the power transmitting apparatus, information corresponding to the request according to a result of a measurement performed by the power transmitting apparatus in a state where a load in the power receiving apparatus is not connected, and
- transmitting, to the power transmitting apparatus, after the load is connected, a packet requesting for reducing voltage according to the information.

* * * * *